(12) United States Patent
Kondo

(10) Patent No.: US 8,767,067 B2
(45) Date of Patent: Jul. 1, 2014

(54) BROADCASTING SYSTEM, SENDING APPARATUS AND SENDING METHOD, RECEIVING APPARATUS AND RECEIVING METHOD, AND PROGRAM

(75) Inventor: Tetsujiro Kondo, Tokyo (JP)

(73) Assignee: Sony Corporation (JP)

( * ) Notice: Subject to any disclaimer, the term of this patent is extended or adjusted under 35 U.S.C. 154(b) by 435 days.

(21) Appl. No.: 12/735,489

(22) PCT Filed: Feb. 13, 2009

(86) PCT No.: PCT/JP2009/052363
§ 371 (c)(1),
(2), (4) Date: Jul. 21, 2010

(87) PCT Pub. No.: WO2009/101997
PCT Pub. Date: Aug. 20, 2009

(65) Prior Publication Data
US 2010/0289894 A1    Nov. 18, 2010

(30) Foreign Application Priority Data
Feb. 14, 2008   (JP) .............................. P2008-032673

(51) Int. Cl.
*H04N 9/47*   (2006.01)
(52) U.S. Cl.
USPC ......................................................... 348/135
(58) Field of Classification Search
USPC ......................................................... 348/135
See application file for complete search history.

(56) References Cited

U.S. PATENT DOCUMENTS

| | | | |
|---|---|---|---|
| 4,991,012 A | * | 2/1991 | Yoshino .......................... 348/588 |
| 5,083,205 A | * | 1/1992 | Arai ................................ 348/555 |

(Continued)

FOREIGN PATENT DOCUMENTS

| | | | |
|---|---|---|---|
| EP | 1331812 A2 * | 7/2003 | ............... H04N 5/44 |
| JP | 09006944 A | 1/1997 | |

(Continued)

OTHER PUBLICATIONS

Kawakita et al., Axi-Visiion Camera (real-time distance-mapping camera), Aug. 2000, Optical Society of America, vol. 39, No. 22, pp. 1-9.*

(Continued)

*Primary Examiner* — Sath V Perungavoor
*Assistant Examiner* — Peter D Le
(74) *Attorney, Agent, or Firm* — Lerner, David, Littenberg, Krumholz & Mentlik, LLP

(57) ABSTRACT

The present invention relates to a broadcasting system, a sending apparatus and a sending method, a receiving apparatus and a receiving method, and a program that make it possible to cause a user to feel a sense of realism, to display an image suitable for the preferences of a user, or the like by performing an appropriate process on a receiving side of the broadcasting system.

A sending apparatus 11 sends material data, which is acquired by a sensor, and additional information, which is used to process the material data with a receiving apparatus 12. The receiving apparatus 12 receives the material data and the additional information, and generates output data on the basis of the material data and the additional information. Further, the receiving apparatus 12 produces output on the basis of the output data, e.g., produces output with output means such as a display device or an air conditioner. The present invention can be applied to, for example, a broadcasting system that broadcasts.

23 Claims, 21 Drawing Sheets

(56) References Cited

U.S. PATENT DOCUMENTS

| | | | |
|---|---|---|---|
| 5,208,660 A * | 5/1993 | Yoshida | 348/555 |
| 6,557,171 B1 * | 4/2003 | Sonoda et al. | 725/136 |
| 7,013,479 B2 * | 3/2006 | Mori | 725/93 |
| 2001/0007558 A1 * | 7/2001 | Kitazawa | 370/390 |
| 2001/0049471 A1 * | 12/2001 | Suzuki et al. | 600/300 |
| 2002/0087999 A1 * | 7/2002 | Kashima | 725/100 |
| 2003/0003990 A1 * | 1/2003 | Von Kohorn | 463/25 |
| 2003/0018969 A1 * | 1/2003 | Humpleman et al. | 725/34 |
| 2003/0054758 A1 * | 3/2003 | Kawamata et al. | 455/3.04 |
| 2003/0110515 A1 * | 6/2003 | Satoda | 725/135 |
| 2003/0135539 A1 * | 7/2003 | Kondo et al. | 709/201 |
| 2003/0195398 A1 * | 10/2003 | Suzuki et al. | 600/300 |
| 2003/0195863 A1 * | 10/2003 | Marsh | 707/1 |
| 2004/0014484 A1 * | 1/2004 | Kawashima | 455/550.1 |
| 2004/0039489 A1 * | 2/2004 | Moore et al. | 700/284 |
| 2004/0097288 A1 * | 5/2004 | Sloate et al. | 463/42 |
| 2005/0044201 A1 * | 2/2005 | Suzuki et al. | 709/223 |
| 2005/0155078 A1 * | 7/2005 | Imada et al. | 725/114 |
| 2006/0238809 A1 * | 10/2006 | Suzuki | 358/1.16 |
| 2007/0022435 A1 * | 1/2007 | Kwon | 725/38 |
| 2007/0100698 A1 * | 5/2007 | Neiman et al. | 705/14 |
| 2007/0157225 A1 * | 7/2007 | Harada et al. | 725/23 |
| 2007/0275780 A1 * | 11/2007 | Sloate et al. | 463/42 |
| 2008/0256574 A1 * | 10/2008 | Lee et al. | 725/32 |
| 2009/0009424 A1 * | 1/2009 | Kang et al. | 345/1.3 |
| 2009/0033803 A1 * | 2/2009 | Kwak et al. | 348/725 |
| 2009/0144137 A1 * | 6/2009 | Moulton et al. | 705/14 |
| 2009/0217320 A1 * | 8/2009 | Aldrey | 725/37 |
| 2009/0326723 A1 * | 12/2009 | Moore et al. | 700/284 |
| 2010/0162295 A1 * | 6/2010 | Shin et al. | 725/30 |
| 2011/0252447 A1 * | 10/2011 | Suzuki et al. | 725/41 |

FOREIGN PATENT DOCUMENTS

| | | |
|---|---|---|
| JP | 2000-358222 A | 12/2000 |
| JP | 2003219372 A | 7/2003 |
| JP | 2006-217662 A | 8/2006 |

OTHER PUBLICATIONS

Kawakita et al., Axi-Vision Camera (real-time distance-mapping camera), 2000, Optical Society of America, pp. 1-9.*

Office Action from Japanese Application No. 2008-032673, dated Feb. 7, 2012.

Supplementary European Search Report EP 09711145, dated Jan. 26, 2012.

* cited by examiner

US 8,767,067 B2

BROADCASTING SYSTEM, SENDING APPARATUS AND SENDING METHOD, RECEIVING APPARATUS AND RECEIVING METHOD, AND PROGRAM

CROSS-REFERENCES TO RELATED APPLICATIONS

The present application is a national phase entry under 35 U.S.C. §371 of International Application No. PCT/JP2009/052363 filed Feb. 13, 2009, published on Aug. 20, 2009 as WO 2009/101997 A1, which claims priority from Japanese Patent Application No. JP 2008-032673 filed in the Japanese Patent Office on Feb. 14, 2008.

BACKGROUND OF THE INVENTION

1. Technical Field

The present invention relates to a broadcasting system, a sending apparatus and a sending method, a receiving apparatus and a receiving method, and a program, and, more particularly, it relates to, for example, a broadcasting system, a sending apparatus and a sending method, a receiving apparatus and a receiving method, and a program that make it possible to perform an appropriate process on a receiving side of the broadcasting system.

2. Background Art

For example, in the current broadcasting system for analog broadcasting or digital broadcasting, images and sounds are edited as material data in a broadcast station being on a sending side. The edited images and sounds are broadcasted as programs.

On the other hand, for example, in each home being on a receiving side, output of the programs broadcasted from the broadcast station, i.e., display of the images and output of the sounds as the programs, are performed by a TV (a television set) or the like.

Note that, when attention is focused on one program, one type of image and sound that is obtained as a result of editing performed in the broadcast station is broadcasted as one program in the current broadcasting system. Accordingly, users being on the receiving side can enjoy only the one type of image and sound.

However, requests for user participation, e.g., regarding one program such as a drama program, a request that a user desires to watch the development of the drama program from the point of view of a user's favorite character and a request that a user desires to cause the story development to differ depending on a point of view, potentially exist.

Hence, the present applicant has previously proposed a digital broadcasting receiving apparatus allowing a user to arbitrarily select and monitor a plurality of materials that are prepared in advance from different points of view (for example, see Patent Document 1).

[Patent Document 1] Japanese Unexamined Patent Application Publication No. 2006-217662

TECHNICAL PROBLEM

Meanwhile, in the broadcast station, for example, images and sounds are edited as described above. However, the editing is not performed with consideration of a display screen, in which the images are to be displayed, of a TV provided on the receiving side.

Accordingly, when the display screen of a TV provided on the receiving side is large, the face of a person is displayed, on the TV, in a size that is larger than a size of the face in a case in which the face is actually looked at, so that the sense of realism may be reduced.

Furthermore, on the TV provided on the receiving side, for example, as described above, the edited images and sounds, which were edited in the broadcast station, are displayed.

Accordingly, for example, when editing in which a large number of telops are combined with an image is performed in the broadcast station, even a user (an audience) that feels that emphasis effects using the telops are unnecessary must watch the image with which the large number of telops are combined.

SUMMARY OF THE INVENTION

The present invention has been made in view of such circumstances, and makes it possible to perform an appropriate process on a receiving side of a broadcasting system, thereby making it possible, for example, to cause a user to feel a sense of realism or to display an image suitable for the preferences of a user.

TECHNICAL SOLUTION

A broadcasting system according to a first aspect of the present invention is a broadcasting system including a sending apparatus that sends data and a receiving apparatus that receives the data. The sending apparatus includes sending means for sending material data, which is acquired by a sensor, and additional information, which is used to process the material data with the receiving apparatus. The receiving apparatus includes receiving means for receiving the material data and the additional information; generating means for generating output data on the basis of the material data and the additional information; and output means for producing output on the basis of the output data.

In the first aspect as described above, the sending apparatus sends material data, which is acquired by the sensor, and additional information, which is used to process the material data with the receiving apparatus. The receiving apparatus receives the material data and the additional information, and generates output data on the basis of the material data and the additional information. Then, output is produced on the basis of the output data.

A sending apparatus or a program according to a second aspect of the present invention is a sending apparatus that, together with a receiving apparatus which receives data, configures a broadcasting system and that sends the data, or a program for causing a computer to function as the sending apparatus. The sending apparatus includes sending means for sending material data, which is acquired by a sensor, and additional information, which is used to process the material data with the receiving apparatus.

A sending method according to the second aspect of the present invention is a sending method for a sending apparatus that, together with a receiving apparatus which receives data, configures a broadcasting system and that sends the data. The sending method includes a step of sending material data, which is acquired by a sensor, and additional information, which is used to process the material data with the receiving apparatus, with the sending apparatus.

In the second aspect as described above, material data, which is acquired by the sensor, and additional information, which is used to process the material data with the receiving apparatus, are sent.

A receiving apparatus or a program according to a third aspect of the present invention is a receiving apparatus that, together with a sending apparatus which sends data, configures a broadcasting system and that receives the data, or a program for causing a computer to function as the receiving apparatus. The receiving apparatus includes, in a case in which the sending apparatus sends material data, which is acquired by a sensor, and additional information, which is used to process the material data with the receiving apparatus, receiving means for receiving the material data and the additional information; generating means for generating output data on the basis of the material data and the additional information; and output means for producing output on the basis of the output data.

A receiving method according to the third aspect of the present invention is a receiving method for a receiving apparatus that, together with a sending apparatus which sends data, configures a broadcasting system and that receives the data. The receiving method includes the steps of: in a case in which the sending apparatus sends material data, which is acquired by a sensor, and additional information, which is used to process the material data with the receiving apparatus, with the receiving apparatus, receiving the material data and the additional information; generating output data on the basis of the material data and the additional information; and producing output on the basis of the output data with output means for producing output.

In the third aspect as described above, the material data and the additional information are received, and output data is generated on the basis of the material data and the additional information. Then, output is produced on the basis of the output data by the output means for producing output.

Note that the programs can be provided by being transmitted via a transmission medium or by being recorded on a recording medium.

Furthermore, the sending apparatus or the receiving apparatus may be an independent apparatus, or may be an internal block configuring one apparatus.

Further, sending (broadcasting) (transmission) of data can also be performed via a wired or wireless transmission medium, and can also be performed via a mixed wired and wireless transmission medium.

ADVANTAGEOUS EFFECTS

According to the first to third aspects of the present invention, an appropriate process can be performed on a receiving side of the broadcasting system.

EXPLANATION OF REFERENCE NUMERALS

11 sending apparatus, 12 receiving apparatus, 13 transmission medium, 31 sensor section, 32 editing device, 33 encoding section, 34 sending section, 51 receiving section, 52 decoding section, 53 separation section, 54 generating section, 55 output section, 56 input section, 71 BF, 72 additional-information analyzing unit, 73 image processing unit, 81 image-data BF, 82 additional-information analyzing unit, 83 to-be-combined-data BF, 84 image processing unit, 91 image selecting part, 92 instruction selecting part, 93 display-region setting part, 94 gate part, 95 superimposing processing part, 101 generating section, 102 output section, 103 input section, 111 generating section, 112 output section, 113 input section, 201 bus, 202 CPU, 203 ROM, 204 RAM, 205 hard disk, 206 output unit, 207 input unit, 208 communication unit, 209 drive, 210 input/output interface, 211 removable recording medium

BEST MODES FOR CARRYING OUT THE INVENTION

DETAILED DESCRIPTION

Figure 1:
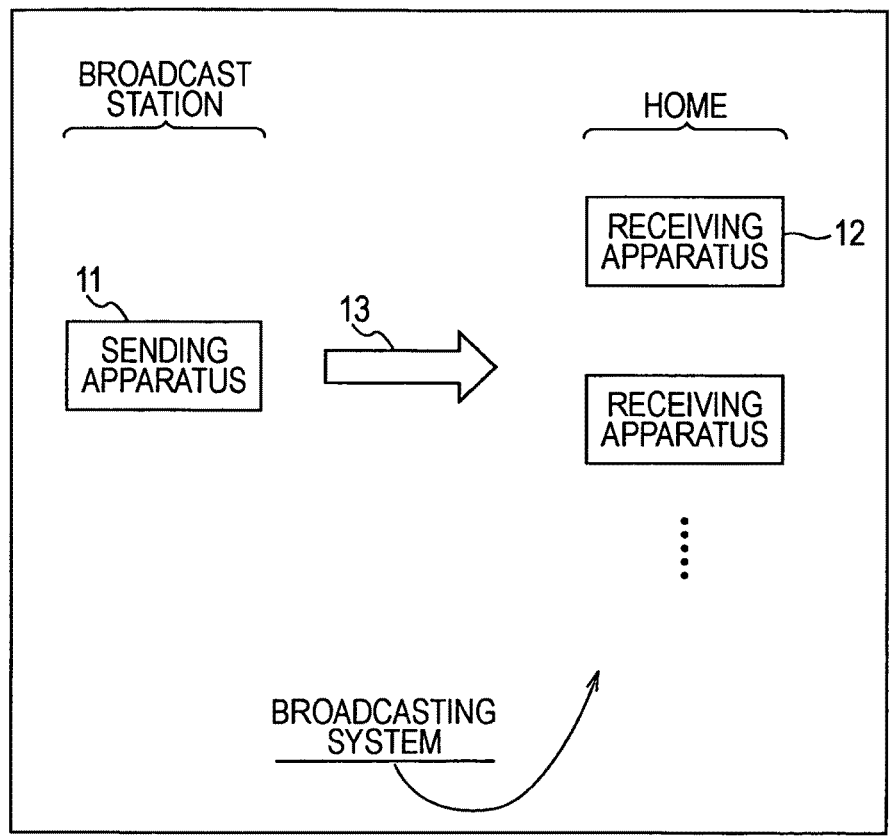
FIG. 1 is a block diagram illustrating an example of a configuration of an embodiment of a broadcasting system to which the present invention is applied.

FIG. 1 illustrates an example of a configuration of an embodiment of a broadcasting system (the term system refers to a logical set of a plurality of apparatuses regardless of whether or not the apparatuses having individual configurations reside in the same housing) to which the present invention is applied.

In FIG. 1, the broadcasting system includes a sending apparatus 11 and a receiving apparatus 12.

The sending apparatus 11 is placed, for example, in a broadcast station, and sends various types of data as programs via a transmission medium 13 such as a ground wave, a satellite circuit, the Internet, or a CATV (Cable Television).

The receiving apparatus 12 is placed, for example, in home, and receives data that is sent from the sending apparatus 11 via the transmission medium 13.

Note that the receiving apparatus 12 is capable of functioning as, for example, a TV.

Furthermore, in the broadcasting system, the number of sending apparatuses 11 is not limited to one, and a plurality of sending apparatuses 11 can be provided. A similar configuration is also applied to the receiving apparatuses 12.

Figure 2:
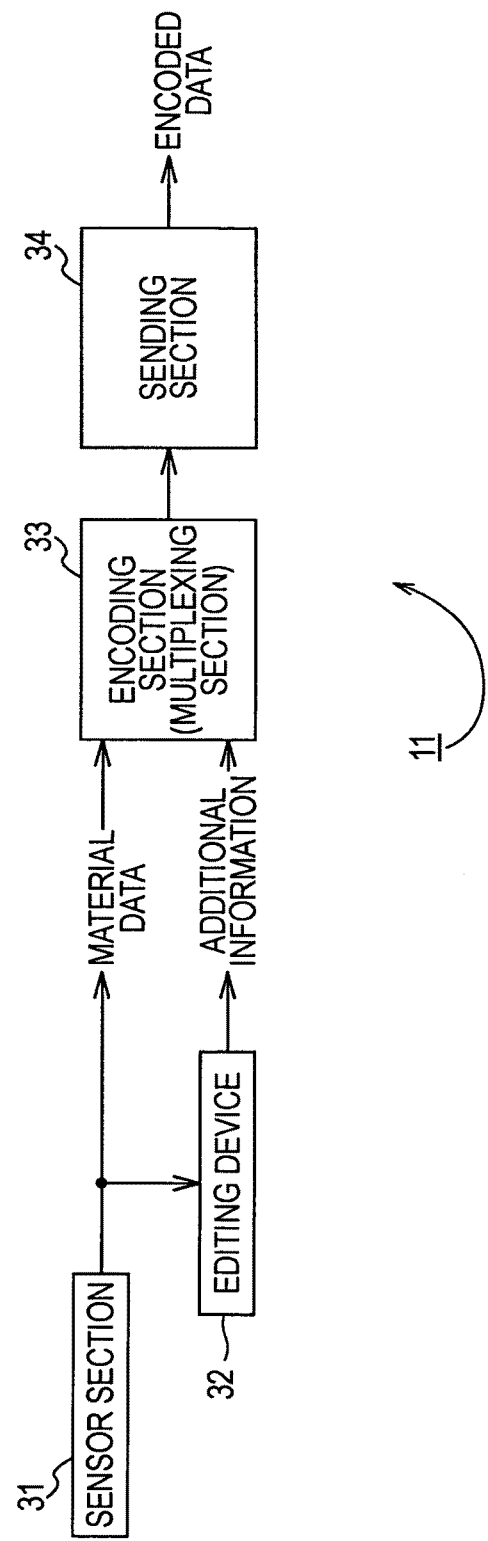
FIG. 2 is a block diagram illustrating an example of a configuration of a sending apparatus 11.

FIG. 2 illustrates an example of a configuration of the sending apparatus 11 illustrated in FIG. 1.

In FIG. 2, the sending apparatus 11 includes a sensor section 31, an editing device 32, an encoding section 33, and a sending section 34.

Note that the sensor section 11 and the editing device 32 can be provided as apparatuses different from the sending apparatus 11.

The sensor section 31 obtains material data that serves as a material in editing with the editing device 32, and supplies the material data to the editing device 32 and the encoding section 33.

Here, one type of sensor, one type of sensors, or a plurality of types of sensors can be employed as the sensor section 31.

Furthermore, examples of types of sensors include a camera that senses light and that outputs an image (that captures an image), a microphone that senses audio and that outputs a sound (that collects audio), and sensors that individually sense a temperature, a humidity, an air-flow direction, an air-flow speed, a vibration, a brightness, and so forth.

With the camera, an image is captured, and the image (data) is output as material data. Furthermore, with the microphone, audio is collected, and a sound (data) is output as material data. In addition, with each of the sensors, which senses a corresponding one of a temperature, a humidity, an air-flow direction, an air-flow speed, a vibration, and a brightness, data indicating a corresponding one of a temperature, a humidity, an air-flow direction, an air-flow speed, a vibration, and a brightness is output as material data.

The editing device 32 generates, on the basis of material data supplied from the sensor section 31, additional information that is to be used to process the material data with the receiving apparatus 12, and supplies the additional information to the encoding section 33.

Here, the additional information includes real-world information indicating a physical amount, in the real world, of a target that has been sensed by the sensor section 31, and effect information that is information which is to be used to process material data.

The effect information is generated, for example, in accordance with an operation performed by operating the editing device 32 with a program producer who produces a program in the broadcast station.

The real-world information is generated regardless of the operation performed by the program producer.

Note that, in the editing device 32, the additional information is generated in for each type of material data. Accordingly, when a plurality of types of sensors are employed in the sensor section 31 and a plurality of types of material data are supplied from the sensor section 31 to the encoding section 33, additional information corresponding to each of the plurality of types of material data is supplied from the editing device 32 to the encoding section 33.

The encoding section 33 encodes the material data supplied from the sensor section 31 and the additional information supplied from the editing device 32. Note that the encoding section 33 performs multiplexing on the material data and encoded data on an as-needed basis. Then, the encoding section 33 supplies the encoded data that is obtained as a result of encoding to the sending section 34.

The sending section 34 sends the encoded data supplied from the encoding section 33, i.e., the material data acquired by the sensor section 31 and the additional information generated by the editing device 32, via the transmission medium 13 (FIG. 1).

Next, the effect information included in the additional information that is generated by the editing device 32 will be described.

Figure 3:
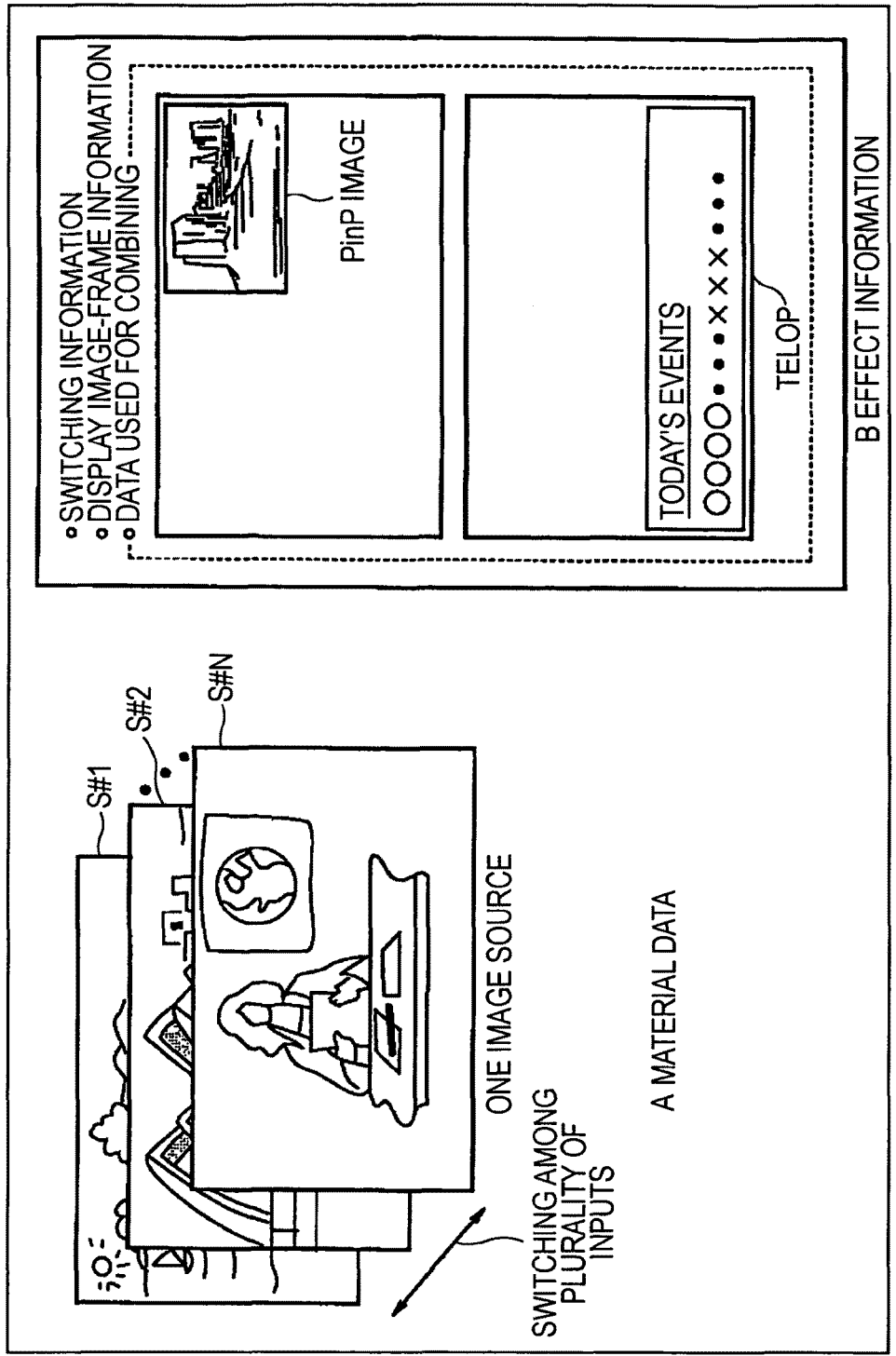
FIG. 3 includes diagrams for explaining pieces of material data and effect information.

FIG. 3 illustrates pieces of material data and effect information corresponding to the pieces of the material data.

In other words, part A of FIG. 3 illustrates a plurality of streams of images (moving images) that are provided as pieces of material data.

For example, when an image for a certain program is configured by editing N, which is a plural number, streams of images S#1, S#2, . . . , and S#N, the N streams of images S#1 to S#N serve as pieces of material data for the image for the program.

Here, the N streams of images S#1 to S#N may be images individually acquired by N cameras which are provided as N sensors, or may be images acquired by M (<N) cameras which are provided as M sensors where M is smaller than N (and is equal to and larger than one).

In other words, for example, N streams of images that are obtained by capturing images of landscapes of different places with one camera at different times can be employed as the N streams of images S#1 to S#N.

Furthermore, N streams of images that can be employed as the N streams of images S#1 to S#N are as follows: N streams of images obtained by individually capturing images of an entire orchestra, a conductor, a player playing a specific music instrument, an auditorium, and so forth, for example, with N cameras; N streams of images obtained by individually capturing images of an entire stadium, a score board, a specific player, an auditorium, and so forth in sports coverage such as football coverage; and N streams of images obtained by individually capturing images of an entire studio, each cast, and so forth in a music program or the like.

Part B of FIG. 3 illustrates effect information corresponding to the N streams of images S#1 to S#N that are pieces of material data illustrated in part A of FIG. 3.

The effect information includes, for example, switching information, display image-frame information, data used for combining, and so forth.

The switching information is, for example, information for switching among images displayed on a display device, which is described below, of the receiving apparatus 12 by selecting one steam of images from among the N streams of images S#1 to S#N that are pieces of material data.

The display image-frame information indicates, for example, a region corresponding to a portion, which to be displayed on the display device of the receiving apparatus 12, of an image (in FIG. 3, one stream of images among the images S#1 to S#N) that is material data.

The data used for combining is, for example, data that is to be used to be combined with an image (in FIG. 3, one stream of images among the images S#1 to S#N) which is material data, and includes to-be-combined data, which is to be combined with the image.

Here, examples of the to-be-combined data include data (data for picture-in-picture) concerning an image to be displayed in a small screen using picture-in-picture (hereinafter, referred to a PinP image), data concerning a telop (data concerning a subtitle), and so forth.

Next, the switching information included in the effect information illustrated in FIG. 3 will be described with reference to FIG. 4.

For example, as described above, when an image for the certain program A is configured by editing the N streams of images S#1 to S#N, the switching information is information for switching among images displayed on the display device of the receiving apparatus 12 by selecting one steam of images from among the N streams of images S#1 to S#N.

Figure 4:
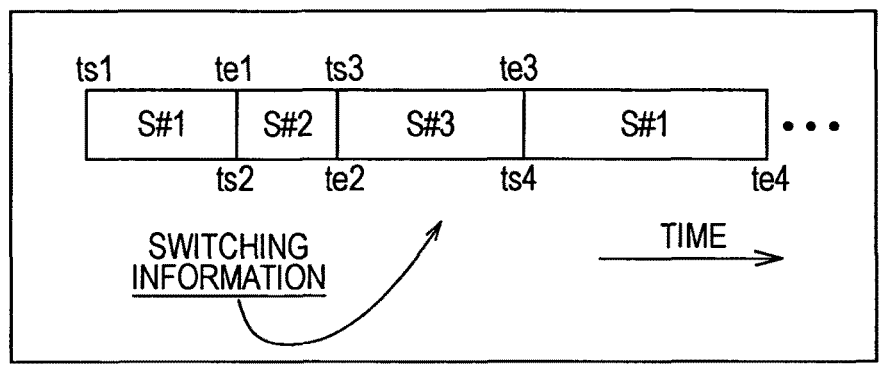
FIG. 4 is a diagram for explaining switching information.

For example, in the editing device 32 illustrated in FIG. 2, cutting and editing are performed by sequentially connecting the images S#1, which is a piece of material data, in a range from a time code $t_{s1}$ to a time code $t_{e1}$, the images S#2, which is a piece of material data, in a range from a time code $t_{s2}$ to a time code $t_{e2}$, the images S#3, which is a piece of material data, in a range from a time code $t_{s3}$ to a time code $t_{e3}$, the images S#1, which is a piece of material data, in a range from a time code $t_{s4}$ to a time code $t_{e4}$, . . . with each other in accordance with an operation performed by the program producer as illustrated in FIG. 4, thereby producing (an image for) the certain program A. In this case, for example, information with which pieces of material data that configure an image for the program A and time codes of the pieces of material data are specified at individual times in the program A serves as the switching information.

Note that, in the editing device 32, when a special effect, such as a wipe, is provided to a connection (a so-called edit point) between a certain stream of images S#i and another stream of images #i', the switching information includes information concerning the special effect.

Next, the display image-frame information included in the effect information illustrated in FIG. 3 will be described with reference to FIG. 5.

The display image-frame information indicates, for example, as described above, a region corresponding to a portion, which is to be displayed on the display device of the receiving apparatus 12, of an image that is material data.

Figure 5:
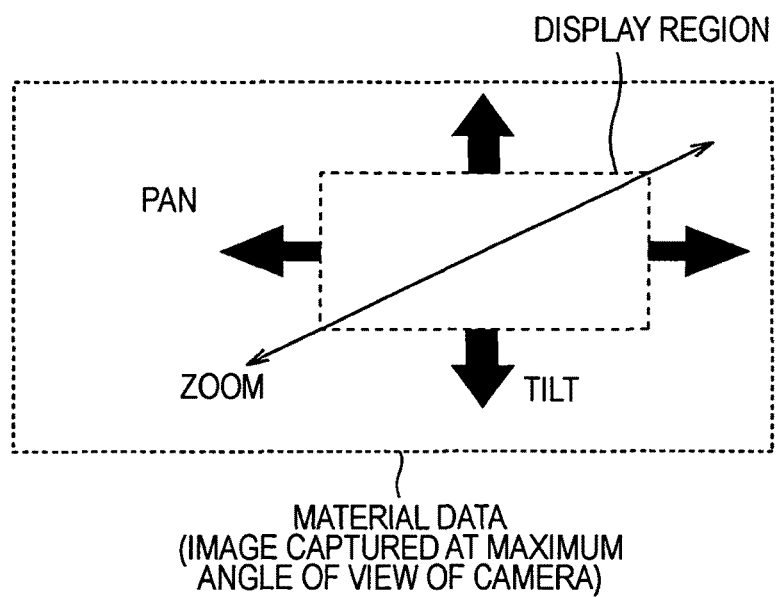
FIG. 5 is a diagram for explaining display angle-of-view information.

In other words, for example, when material data is an image, in the editing device 32, editing can be performed, in which, considering a rectangular region corresponding to a portion of the image, which is material data, as a region (hereinafter, referred to as a display region) corresponding to a portion, which is to be displayed on the display device of the receiving apparatus 12, of the image, the portion of the image is determined as an image for a program in accordance with an operation performed by the program producer as illustrated in FIG. 5.

In this case, in the editing device 32, the program producer can use, as the maximum region, the region of the image that is material data, and can produce a program as if the program producer had captured an image by operating a camera using a pan operation, a tilt operation, or a zoom operation in the region.

Here, the maximum display region is the region of the image that is material data. Accordingly, the angle of view of a camera that is provided as the sensor section 31 (FIG. 2) is set to be the maximum angle of view (to be on the widest angle side), and an image is captured, whereby the size of the display region can be maximized.

Note that any information with which the display region can be specified may be used as the display angle-of-view information.

In other words, for example, a coordinate system is defined with respect to the region of the image that is material data, and in the coordinate system, coordinates between one vertex of the display region and a vertex that is diagonally opposite the vertex, coordinates of one vertex of the display region and horizontal and vertical lengths of the display region, or the like can be employed as the display angle-of-view information.

Furthermore, for example, the display region that is located at a predetermined position and that has a predetermined size can be determined as a default display region, and the history of the pan operation, the tilt operation, and the zoom operation that are performed for the default display region in editing by the program producer can be employed as the display angle-of-view information.

Figure 6:
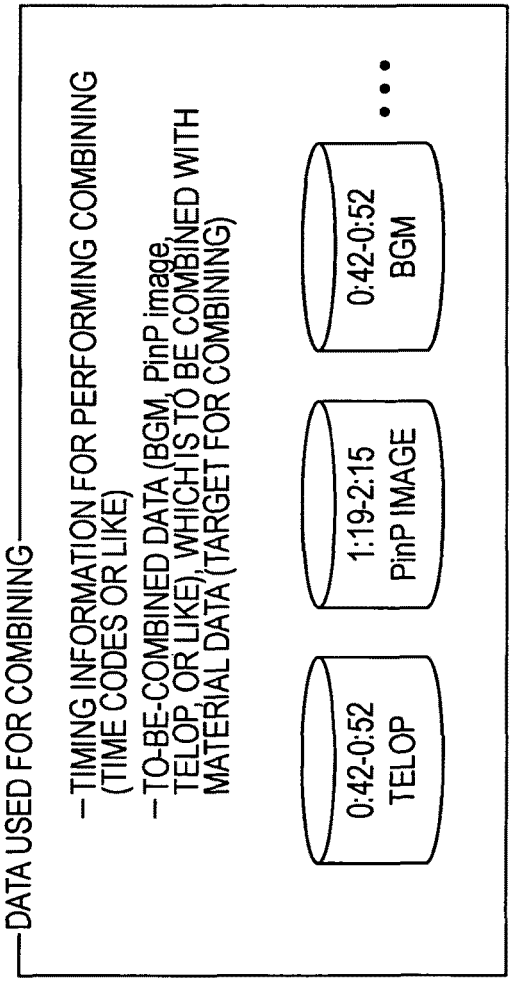
FIG. 6 is a diagram for explaining data used for combining.

Next, the data used for combining included in the effect information illustrated in FIG. 3 will be described with reference to FIG. 6.

As described above, the data used for combining is data that is to be used to be combined with material data. The data used for combining includes to-be-combined data, which is to be combined with material data, and timing information indicating a timing at which combining using the to-be-combined data is performed.

In other words, for example, material data is an image, and, in the editing device 32 illustrated in FIG. 2, editing in which a PinP image or a telop is superimposed on (combined with) the image, which is material data, in accordance with an operation performed by the program producer, thereby producing a program. In this case, the PinP image or the telop serves as the to-be-combined data.

Furthermore, information indicating a time over which the PinP image or the telop, which serves as the to-be-combined data, is superimposed (for example, a time at which the superimposing starts and a time at which the superimposing finishes), e.g., time codes for a program, serves as the timing information.

Note that the data used for combining includes, in addition, for example, information concerning a position, on the image, at which the PinP image or the telop that serves as the to-be-combined data is superimposed.

Moreover, for example, when material data is a sound, BGM (Background Music) or the like serves as the to-be-combined data.

When a certain type of material data is a sound and the sound is a sound accompanied with an image (a moving image) that is another type of material data, information indicating a time with respect to the sound can also be employed as timing information for BGM that is to be combined with the sound, and time codes of the image accompanied with the sound can also be employed.

Next, the real-world information included in the additional information that is generated by the editing device 32 (FIG. 2) will be described.

As described above, the real-world information is information indicating a physical amount, in the real world, of a target that has been sensed by the sensor section 31 (FIG. 2). For example, when the sensor section 31 is a camera, image-capture-range information indicating an image-capture range at a position of an image-capture target (hereinafter, also referred to as an image-capture object) whose image is captured by the camera, and so forth is included in the real-world information.

Here, the image-capture range of the camera will be described with reference to FIG. 7.

Figure 7:
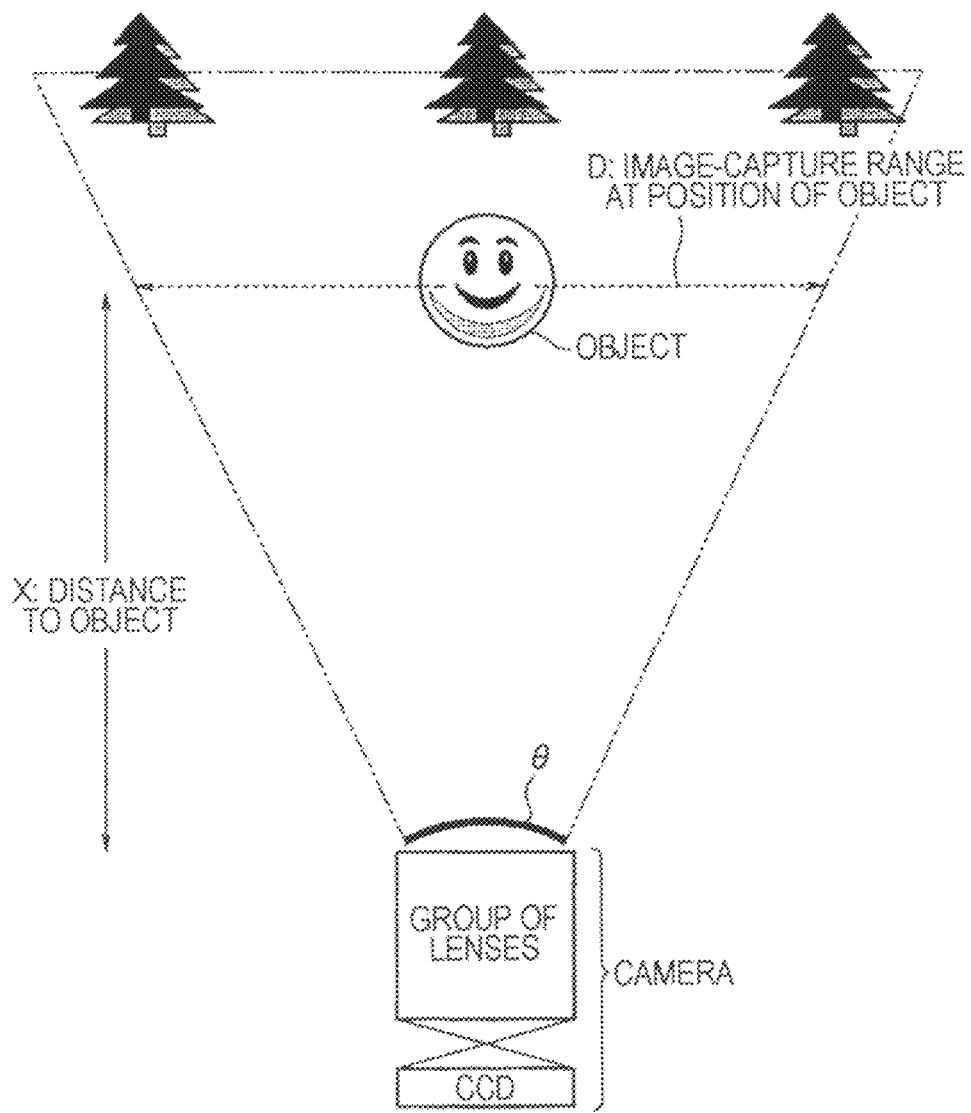
FIG. 7 is a diagram for explaining real-world information.

FIG. 7 is a top view schematically illustrating a state in which an image is being captured by the camera.

Now, for simplicity of description, it is supposed that an optical system (a group of lenses) of the camera has no distortion. It is supposed that an angle of view (hereinafter, also referred to as a "camera angle of view") of the camera in the horizontal direction is θ. In addition, it is supposed that a distance (hereinafter, also referred to as an "object distance") from the camera to the image-capture object is X.

Note that it is supposed that the camera angle of view θ is known.

Furthermore, the object distance X can be measured utilizing, for example, a so-called automatic focus technique.

In other words, the object distance X can be measured using, for example, an infrared ray sensor or a sonar. Furthermore, the object distance X can be measured utilizing a contrast detection scheme, in which the focus is adjusted so that the contrast of an image to be captured by the camera is maximized, a phase-difference detection scheme, in which the focus is adjusted so that differences among phases of images to be captured by the camera are removed, or the like.

Note that, in a case in which the object distance X is known in advance when capture of an image with the camera is performed, measurement of the object distance X is unnecessary.

Now, for simplicity of description, between horizontal and vertical lengths of the real world whose image is captured at the position of the image-capture object, for example, attention is focused on only the horizontal length. It is supposed that the horizontal length is an image-capture range D at the position of the image-capture object.

The image-capture range D can be determined in accordance with an equation D=2×X×tan(θ/2) using the camera angle of view θ and the object distance X.

Hence, in addition to the image that is material data, the editing device 32 illustrated in FIG. 2 also acquires the camera angle of view θ and the object distance X from the camera that is provided as the sensor section 31. The editing device 32 determines the image-capture range D from the camera angle of view θ and the object distance X. Then, the editing device 32 causes the image-capture range D to be included as image-capture-range information in real-world information, and supplies the real-world information to the encoding section 33.

Figure 8:
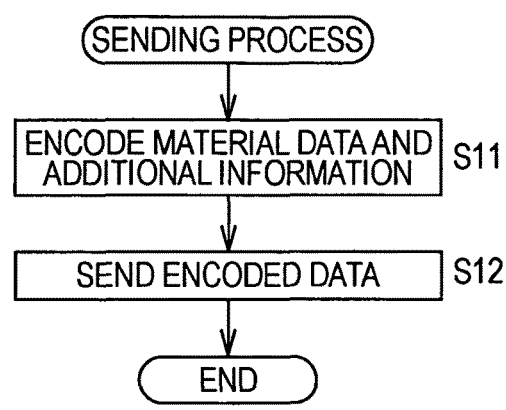
FIG. 8 is a flowchart for explaining a sending process.

Next, a process (a sending process) that is performed by the sending apparatus 11 illustrated in FIG. 2 will be described with reference to FIG. 8.

In the sending apparatus 11, material data that is acquired by the sensor section 31 is supplied to the editing device 32 and the encoding section 33.

In the editing device 32, additional information that includes either or both of effect information and real-world information is generated on the basis of the material data supplied from the sensor section 31 and so forth, and the additional information is supplied to the encoding section 33.

When the material data is supplied from the sensor section 31 to the encoding section 33 and the additional information is supplied from the editing device 32 to the encoding section 33 as described above, in step S11, the encoding section 33 encodes the material data supplied from the sensor section 31 and the additional information supplied from the editing device 32. The encoding section 33 supplies encoded data that is obtained as a result of encoding to the sending section 34, and the process proceeds to step S12.

In step S12, the sending section 34 sends the encoded data, which has been supplied from the encoding section 33, via the transmission medium 13 (FIG. 1).

Figure 9:
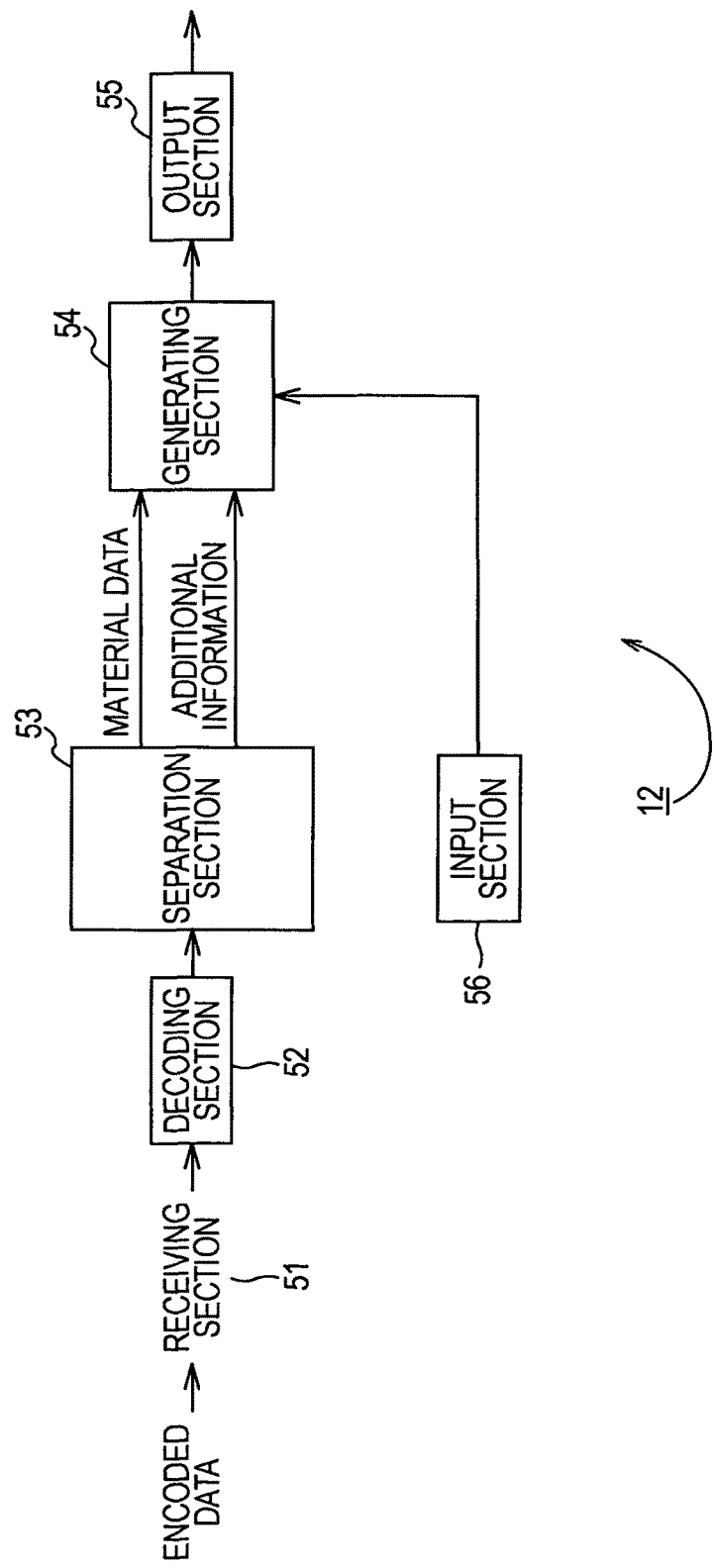
FIG. 9 is a block diagram illustrating an example of a configuration of a receiving apparatus 12.

Next, FIG. 9 illustrates an example of a configuration of the receiving apparatus 12 illustrated in FIG. 1.

In FIG. 9, the receiving apparatus 12 includes a receiving section 51, a decoding section 52, a separation section 53, a generating section 54, an output section 55, and an input section 56.

Note that the output section 55 and the input section 56 can be provided as apparatuses different from the receiving apparatus 12.

The receiving section 51 receives encoded data that is sent from the sending apparatus 11 via the transmission medium 13, i.e., material data and additional information, and supplies the encoded data to the decoding section 52.

The decoding section 52 decodes the encoded data supplied from the receiving section 51 to obtain data, and supplies the data to the separation section 53.

The separation section 53 separates the data supplied from the decoding section 52 into the material data and the additional information, and supplies the material data and the additional information to the generating section 54.

The generating section 54 generates output data on the basis of the material data and the additional information supplied from the separation section 53, and supplies the output data to the output section 55.

The output section 55 produces predetermined output on the basis of the output data supplied from the generating section 54.

Here, a device that stimulates the five senses of a person can be employed as the output section 55.

In other words, a device that stimulates the sense of sight, such as a display device that displays an image or an illumination device that emits light, can be employed as the output section 55. Furthermore, a device that stimulates the sense of hearing, such as a speaker that emits a sound, can be employed as the output section 55.

Moreover, a device that stimulates the sense of touch, such as an air conditioner that can perform so-called air conditioning (air adjustment) (air balance) for temperature, humidity, and air flow or a shaking device that provides vibration, can be employed as the output section 55.

The input section 56 is operated by a user who uses the receiving apparatus 12. When the user operates the input section 56 in order to provide an instruction, the input section 56 accepts the instruction provided by the user, and supplies instruction information indicating the instruction to the generating section 54.

Here, when the instruction information is supplied from the input section 56 to the generating section 54, the generating section 54 generates output data on the basis of the instruction information.

Figure 10:
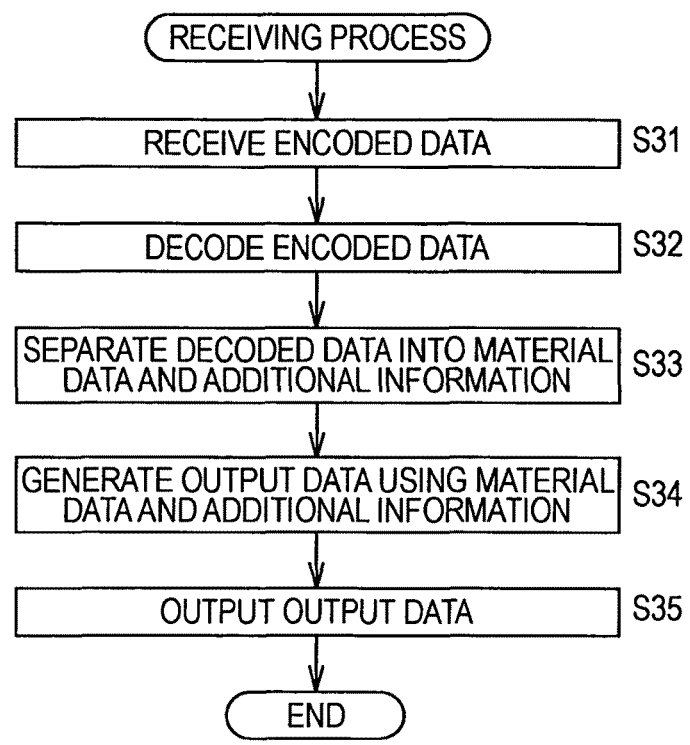
FIG. 10 is a flowchart for explaining a receiving process.

Next, a process (a receiving process) that is performed by the receiving apparatus 12 illustrated in FIG. 9 will be described with reference to FIG. 10.

The receiving section 51 waits for encoded data sent from the sending apparatus 11 via the transmission medium 13. In step S31, the receiving section 51 receives the encoded data, and supplies the encoded data to the decoding section 52. The process proceeds to step S32.

In step S32, the decoding section 52 decodes the encoded data supplied from the receiving section 51 to obtain data, and supplies the data to the separation section 53. The process proceeds to step S33.

In step S33, the separation section 53 separates the data (decoded data), which has been supplied from the decoding section 52, into material data and additional information, and supplies the material data and the additional information to the generating section 54. The process proceeds to step S34.

In step S34, the generating section 54 generates output data on the basis of the material data and the additional information supplied from the separation section 53, and supplies the output data to the output section 55. The process proceeds to step S35.

In step S35, the output section 55 produces predetermined output on the basis of the output data supplied from the generating section 54.

As described above, in the receiving apparatus 12 illustrated in FIG. 9, the process of generating output data is performed on the basis of the material data and the additional information by the generating section 54. The process includes processes, and the processes are classified into a reality-mode process and an entertainment-mode process.

In other words, real-world information and effect information are included in additional information. Among the processes of generating output data, a process performed using the real-world information is the reality-mode process, and a process performed using the effect information is the entertainment-mode process.

Hereinafter, the reality-mode process and the entertainment-mode process will be described.

Figure 11:
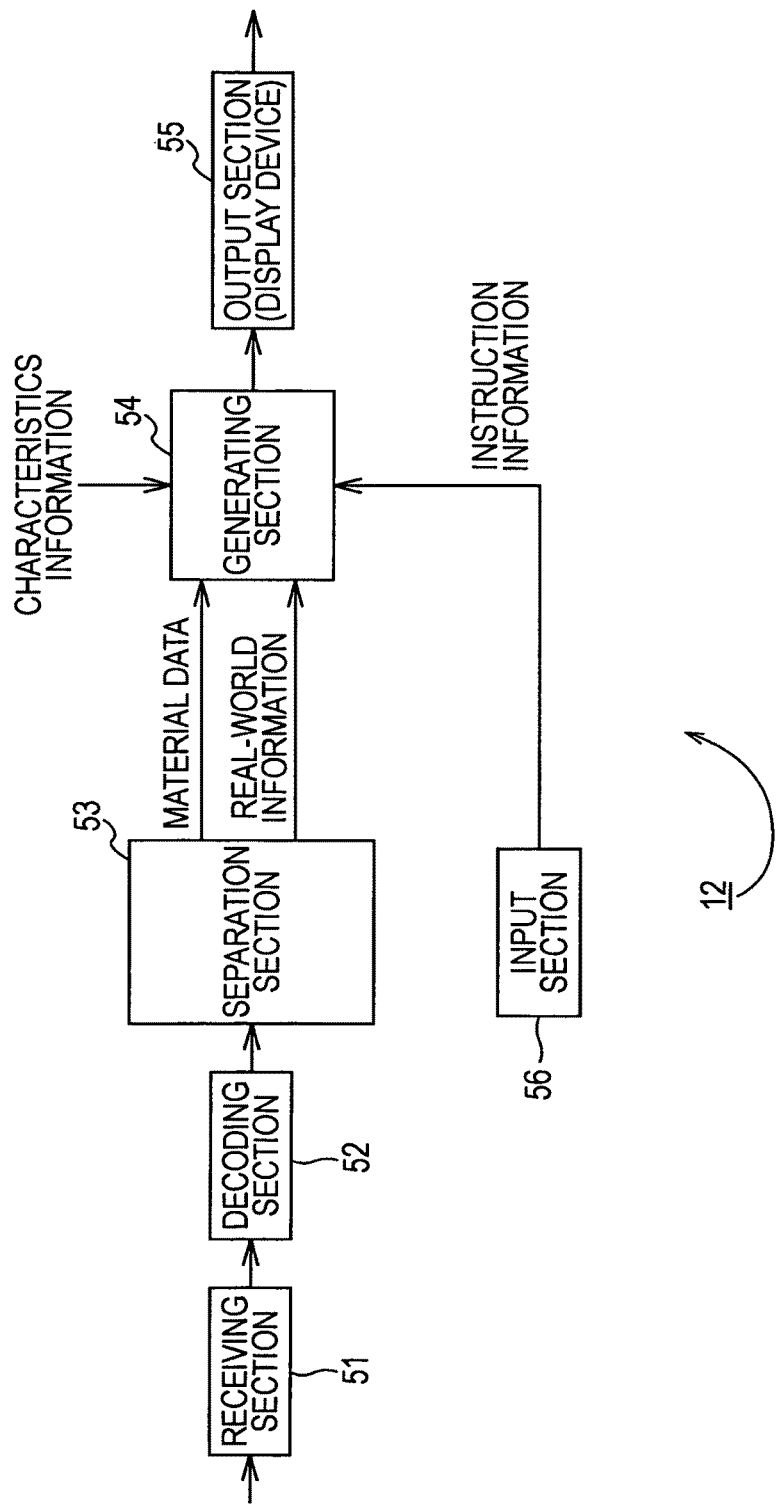
FIG. 11 is a diagram for explaining data that is supplied to a generating section 54 in a reality-mode process.

FIG. 11 illustrates data (information) that is supplied to the generating section 54 when the receiving apparatus 12 performs the reality-mode process.

In the reality-mode process, material data and real-world information that is included in additional information are supplied from the separation section 53 to the generating section 54.

Furthermore, in the reality-mode process, when the user operates the input section 56 so as to provide a zoom instruction, instruction information corresponding to the operation is supplied from the input section 56 to the generating section 54.

Further, in the reality-mode process, characteristics information indicating the characteristics of the output section 55 is supplied to the generating section 54, for example, from the output section 55.

Then, in the reality-mode process, the generating section 54 generates output data on the basis of the material data, the real-world information, and the characteristics information concerning the output section 55 so that a physical amount recognized from an output of the output section 55 will be identified as being a physical amount indicated by the real-world information.

Here, when the instruction information is supplied from the input section 56 to the generating section 54, the generating section 54 generates the output data also on the basis of the instruction information.

Note that, for the reality-mode process, the receiving apparatus 12 can be configured without provision of the input section 56. When the receiving apparatus 12 is configured without provision of the input section 56, no instruction information is supplied to the generating section 54.

Next, for example, supposing that the output section 55 is a display device and output data is an image to be displayed on the output section 55 which is a display device, the reality-mode process will be described.

Here, it is supposed that the image-capture-range information D, which is described with reference to FIG. 7, is included in real-world information. Furthermore, it is supposed that size information F indicating a size of a display screen in which the output section 55 that is a display device displays an image is included in characteristics information.

Note that, here, for simplicity of description, it is supposed that the size information F indicates, between horizontal and vertical lengths of the display screen of the output section 55 that is a display device, for example, the horizontal length as in the case of the image-capture-range information D (the image-capture range D).

Figure 12:
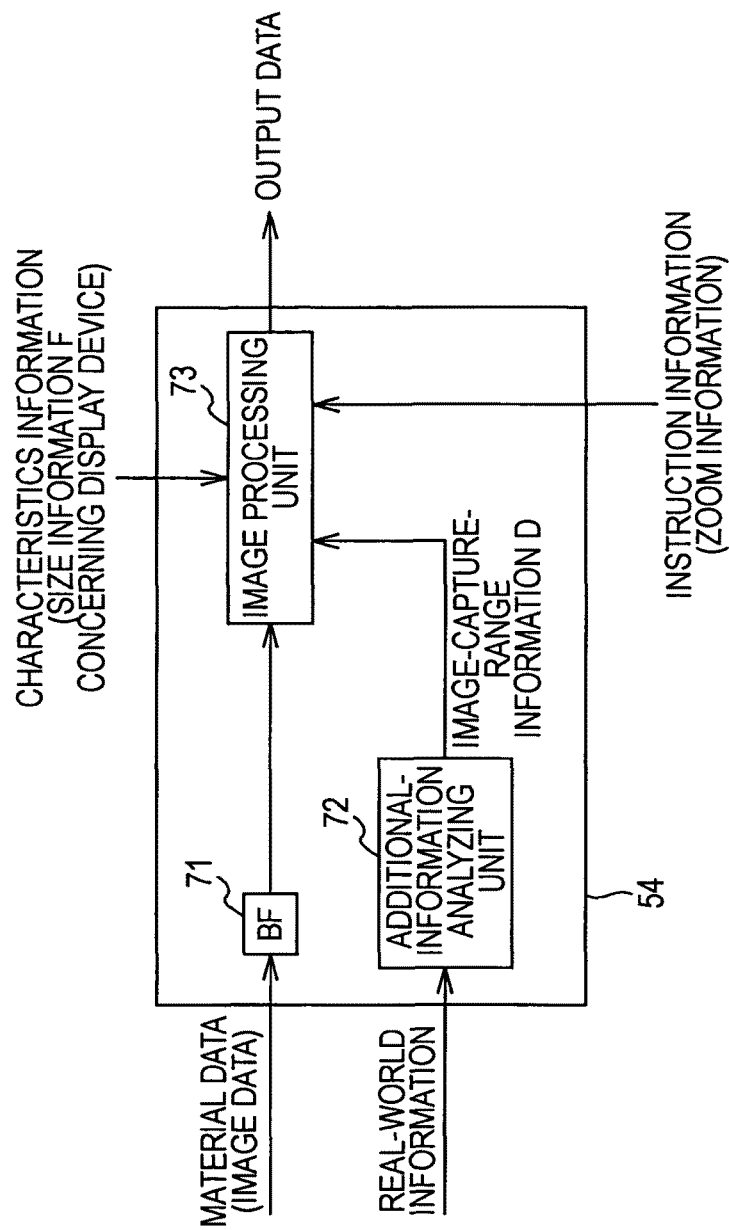
FIG. 12 is a block diagram illustrating an example of a configuration of the generating section 54 that performs the reality-mode process.

FIG. 12 illustrates an example of a configuration of the generating section 54 in a case in which the receiving apparatus 12 performs the reality-mode process.

In FIG. 12, the generating section 54 includes a BF (buffer) 71, an additional-information analyzing unit 72, and an image processing unit 73.

An image that is material data is supplied from the separation section 53 (FIG. 11) to the BF 71. The BF 71 stores the image that is material data supplied from the separation section 53.

Real-world information included in additional information is supplied from the separation section 53 to the additional-information analyzing unit 72. The additional-information analyzing unit 72 analyzes the real-world information supplied from the separation section 53. The additional-information analyzing unit 72 extracts, for example, the image-capture-range information D (FIG. 7) included in the real-world information, and supplies the image-capture-range information D to the image processing unit 73.

As described above, the image-capture-range information D is supplied from the additional-information analyzing unit 72 to the image processing unit 73. Further, the image that is material data stored in the BF 71 is supplied to the image processing unit 73. In addition, the size information F that is characteristics information concerning the display device is supplied from the output section 55 (FIG. 11), which is a display device, to the image processing unit 73.

Furthermore, when the user operates the input section 56 (FIG. 11) so as to provide the zoom instruction, instruction information corresponding to the operation is supplied from the input section 56 to the image processing unit 73.

The image processing unit 73 processes the image, which is material data, on the basis of the image that is material data supplied from the BF 71, the image-capture-range information D that has been supplied from the additional-information analyzing unit 72, and the size information F that is characteristics information supplied from the output section 55, thereby generating an image which is output data so that the size of an object (the image-capture object) recognized from the image displayed on the output section 55 which is a display device will be identified as being the size of the image-capture object in the real world. The image processing unit 73 supplies the output data to the output section 55 (FIG. 11) that is a display device.

Furthermore, the image processing unit 73 processes the image, which is material data, on the basis of the image that is material data supplied from the BF 71, the image-capture-range information D that has been supplied from the additional-information analyzing unit 72, and the size information F that is characteristics information supplied from the output section 55, thereby generating an image as output data so that the size of the image-capture object recognized from the image displayed on the output section 55 that is a display device will not exceed the size of the image-capture object in the real world. The image processing unit 73 supplies the output data to the output section 55 (FIG. 11) that is a display device.

In other words, when the instruction information is supplied from the input section 56 to the image processing unit 73, the image processing unit 73 performs a process of magnifying the image, which is material data supplied from the BF 71, only by a zoom magnification that is specified in the instruction information supplied from the input section 56, thereby generating output data.

However, in this case, the image processing unit 73 limits magnification of the image, which is material data, so that the size of the image-capture object recognized from the image displayed on the output section 55 which is a display device will not exceed the size of the image-capture object in the real world.

Note that, supposing that a magnification in a case of magnifying an image that is material data is a display zoom magnification z, magnification in a case in which the display zoom magnification z is smaller than one (and larger than zero) means reduction.

Furthermore, in FIG. 12, it is supposed that the size information F is supplied from the output section 55, which is a display device, to the image processing unit 73 of the generating section 54. However, otherwise, the size information F can be stored in advance, for example, in the generating section 54.

Next, the processes performed by the image processing unit 73 will further be described.

Note that, here, for simplicity of description, it is supposed that the display region (FIG. 5) indicated by the display angle-of-view information is equal to the entire region of an image that is material data.

Figure 13:
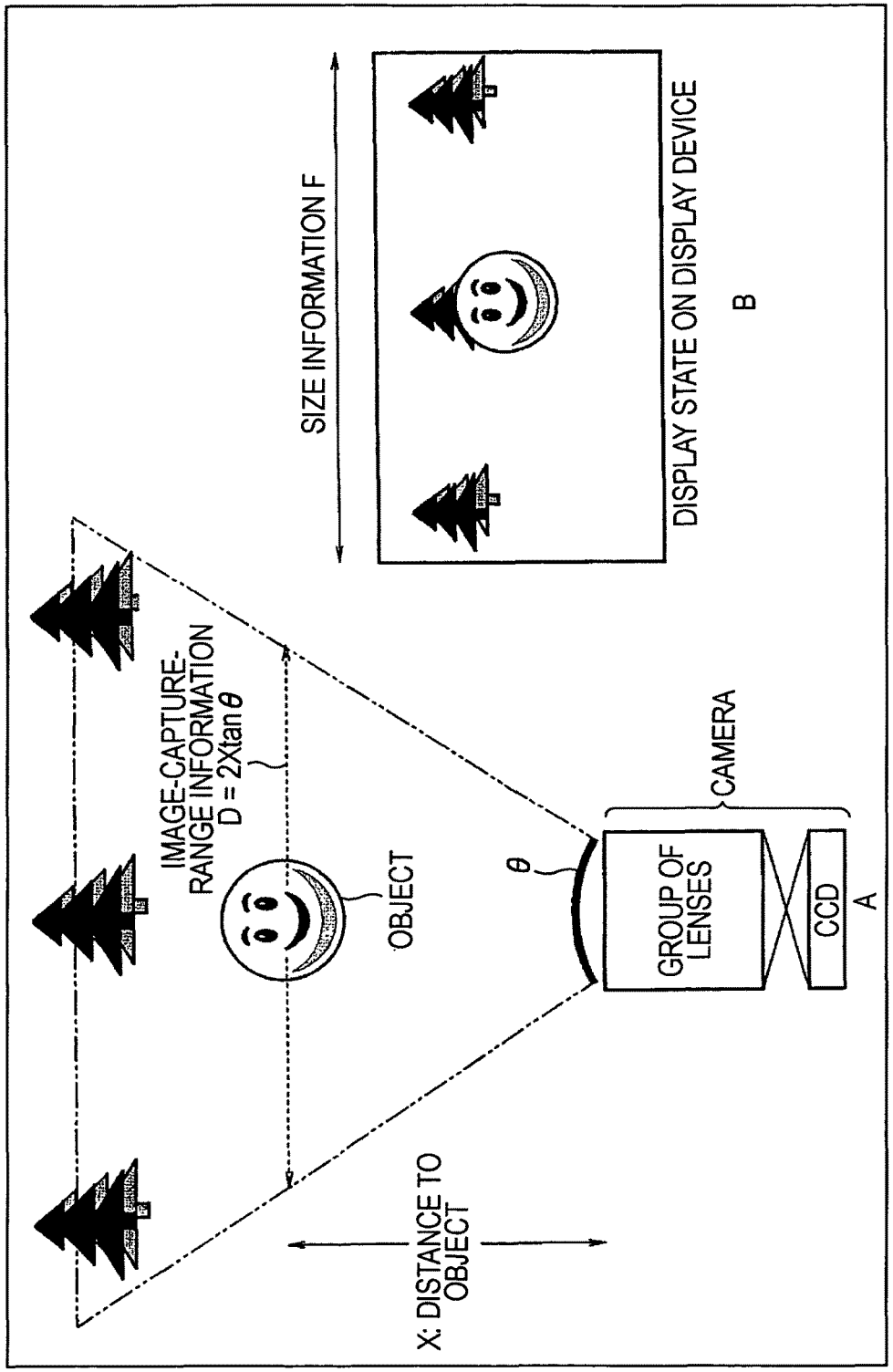
FIG. 13 includes diagrams schematically illustrating a state in which an image of an image-capture object is being captured by a camera and a display state on an output section 55 that is a display device.

FIG. 13 schematically illustrates a state in which an image of the image-capture object is being captured by the camera and a state in which the image that is material data obtained by the image capture is displayed on the output section 55 that is a display device.

In other words, part A of FIG. 13 is a top view schematically illustrating a state in which an image is being captured by the camera, and is a drawing the same as FIG. 7.

As described above, the image-capture-range information D can be determined in accordance with the equation $D = 2 \times X \times \tan\theta/2$ using the camera angle of view $\theta$ and the object distance X.

Part B of FIG. 13 illustrates a display state in which the image that is material data obtained by performing image capture with the camera as illustrated in part A of FIG. 13 is displayed on the output section 55, which is a display device, without being magnified.

On the output section 55 that is a display device, the real world whose size is indicated by the image-capture-range information D is displayed in the display screen whose size is indicated by the size information F.

Accordingly, the image-capture object is displayed in a size that is F/D times the size of the image-capture object in the real world.

Now, supposing that the image-capture-range information D is equal to or larger than the size information F (F≤D), if the display zoom magnification z is equal to or lower than D/F, the size of the image-capture object displayed on the output section 55 that is a display device is equal to or smaller than the size of the image-capture object in the real world.

Accordingly, in a case in which the image-capture-range information D is equal to or larger than the size information F, if the display zoom magnification z is equal to or smaller than D/F, loosing of the reality of the image-capture object displayed on the output section 55, which is a display device, because of a display of the image-capture object on the output section 55, which is a display device, in a size that is larger than the size of the image-capture object in the real world does not occur.

Hence, in the image processing unit 73 (FIG. 12), in a case in which the image-capture-range information D is equal to or larger than the size information F, the display zoom magnification z that is used when magnification of an image which is material data is performed is limited to being equal to or lower than D/F.

In contrast, in a case in which the image-capture-range information D is smaller than the size information F (F>D), when the image that is material data is displayed on the output section 55, which is a display device, without performing any process on the image, the size of the image-capture object displayed on the output section 55 exceeds the size of the image-capture object in the real world.

Accordingly, when the image-capture object is displayed on the output section 55, which is a display device, in a size that is larger than the size of the image-capture object in the real world, the reality of the image-capture object displayed on the output section 55 that is a display device is lost, so that the sense of realism is lost.

As described above, for example, a case in which the output section 55 is a display device having a large screen is considered as a case in which the image-capture-range information D is smaller than the size information F.

Furthermore, for example, also in a case in which an image that is material data is captured using optical zoom or digital zoom, the image-capture-range information D may be smaller than the size information F.

Figure 14:
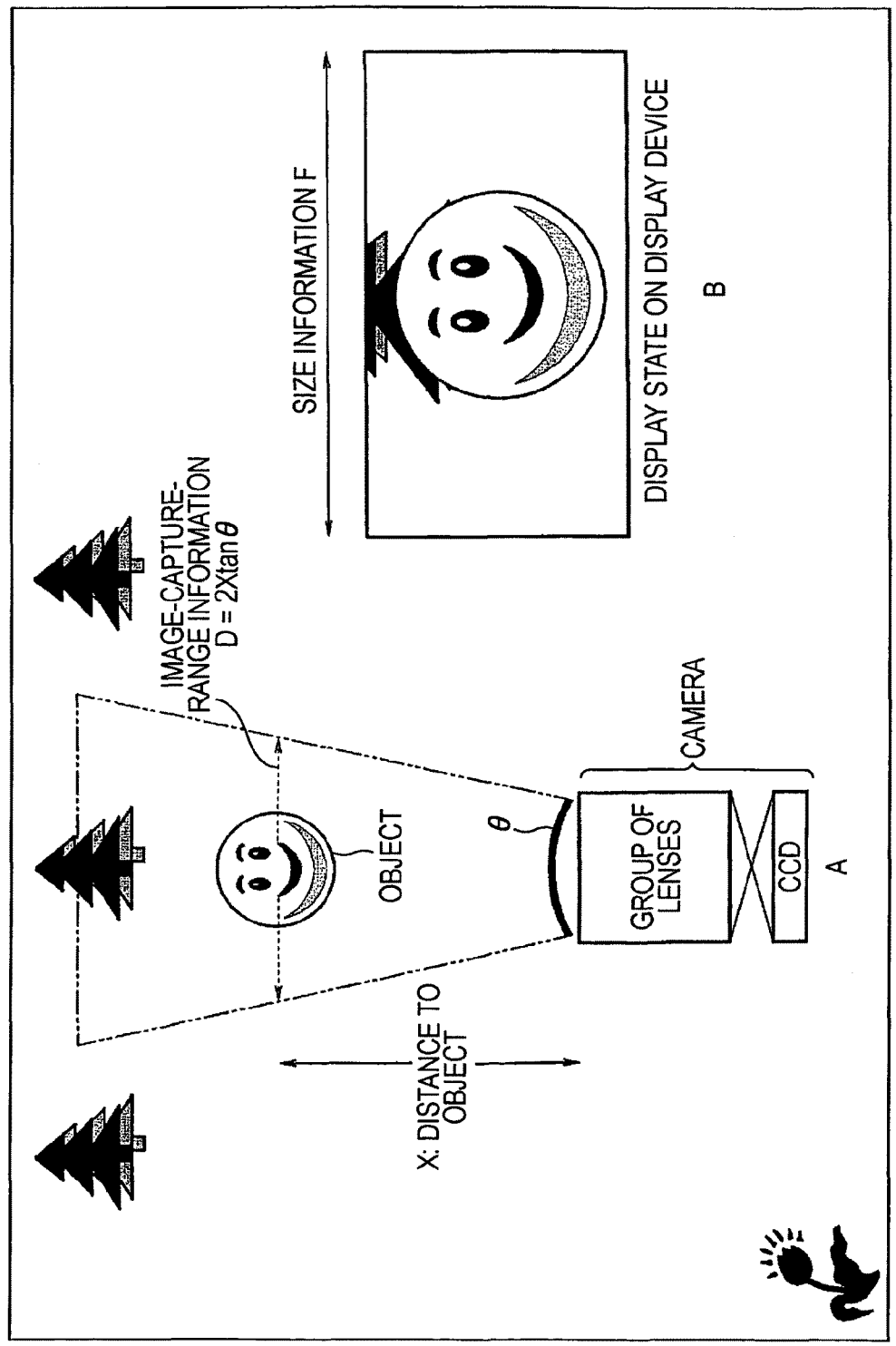
FIG. 14 includes diagrams schematically illustrating a state in which an image of the image-capture object is being captured by the camera using optical zoom and a display state on the output section 55 that is a display device.

FIG. 14 schematically illustrates a state in which an image of the image-capture object is being captured by the camera using optical zoom and a state in which the image that is material data obtained by the image capture is displayed on the output section 55 that is a display device.

In other words, part A of FIG. 14 is a top view schematically illustrating a state in which an image is being captured by the camera using optical zoom.

The camera angle of view $\theta$ is reduced (made to be smaller) using optical zoom. As a result, the image-capture-range information D is made, for example, to be smaller than that in a case illustrated in part A of FIG. 13.

Part B of FIG. 14 illustrates a display state in which the image that is material data obtained by image capture as illustrated in part A of FIG. 14 is displayed on the output section 55 that is a display device.

On the output section 55 that is a display device, the real world whose size is indicated by the image-capture-range information D is displayed in the display screen whose size is indicated by the size information F.

In FIG. 14, the image-capture-range information D is smaller than the size information F. For this reason, the image-capture object is displayed on the output section 55, which is a display device, in a size that is larger than (in a size that is F/D times) the size of the image-capture object in the real world.

Figure 15:
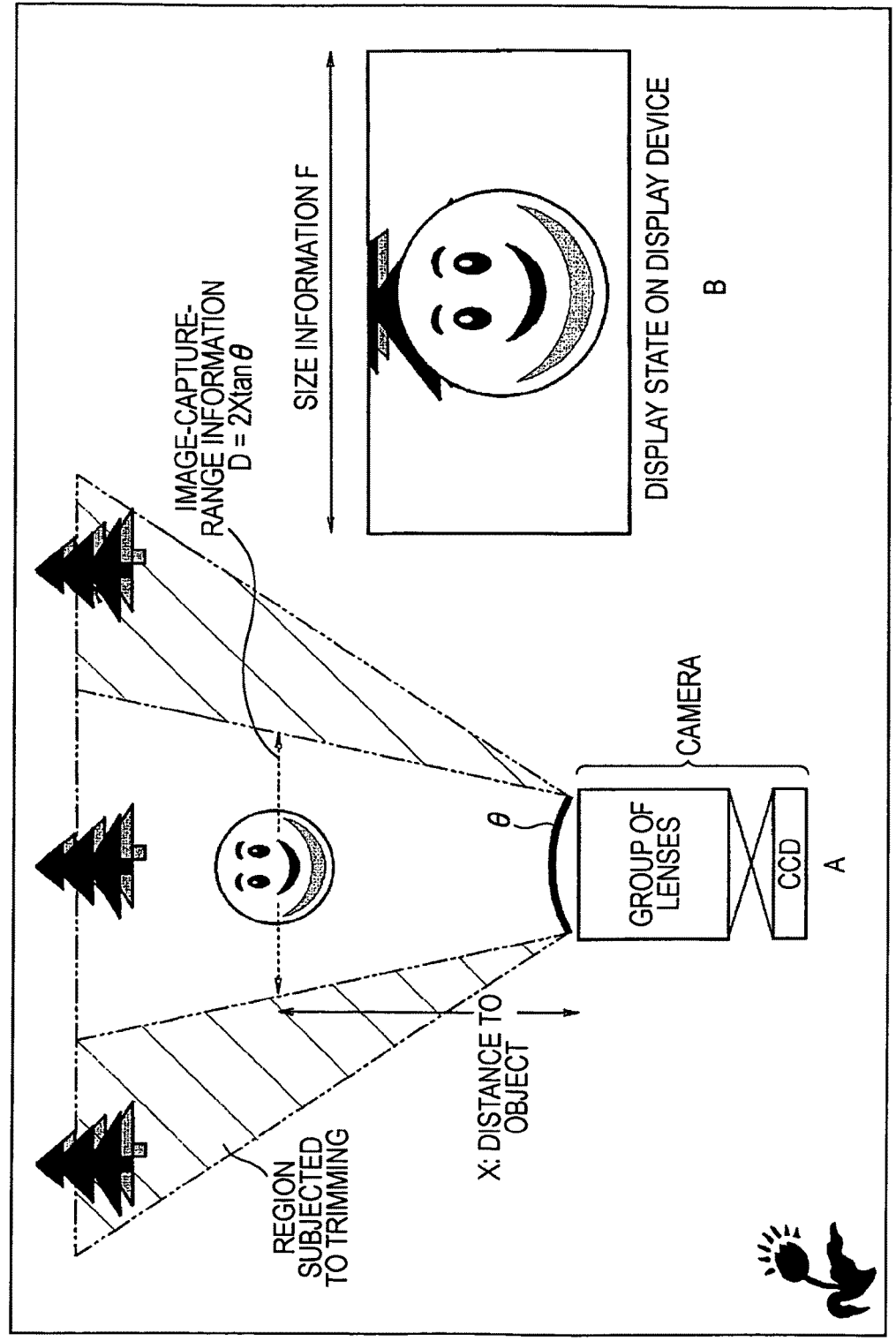
FIG. 15 includes diagrams schematically illustrating a state in which an image of the image-capture object is being captured by the camera using digital zoom and a display state on the output section 55 that is a display device.

FIG. 15 schematically illustrates a state in which an image of the image-capture object is being captured by the camera using digital zoom and a state in which the image that is material data obtained by the image capture is displayed on the output section 55 that is a display device.

In other words, part A of FIG. 15 is a top view schematically illustrating a state in which an image is being captured by the camera using digital zoom.

In a case of digital zoom, an image that is obtained by trimming, in which, for example, a central portion of the image captured by the camera is cut and magnified by signal processing, is output as an image that is material data.

Regarding the image that is material data obtained using digital zoom, the camera angle of view $\theta$ is reduced as in the case of optical zoom (FIG. 14). As a result, the image-capture-range information D is made, for example, to be smaller than that in a case illustrated in part A of FIG. 13.

Part B of FIG. 15 illustrates a display state in which the image that is material data obtained by image capture as illustrated in part A of FIG. 15 is displayed on the output section 55 that is a display device.

On the output section 55 that is a display device, the real world whose size is indicated by the image-capture-range information D is displayed in the display screen whose size is indicated by the size information F.

In FIG. 15, the image-capture-range information D is smaller than the size information F. For this reason, the image-capture object is displayed on the output section 55, which is a display device, in a size that is larger than (in a size that is F/D times) the size of the image-capture object in the real world.

As described above, when an image that is material data is captured using optical zoom or digital zoom, the image-capture-range information D may be smaller than the size information F. In such a case, the image-capture object is displayed in a size that is larger than the size of the image-capture object in the real world, so that the reality is lost.

Hence, in the image processing unit 73 (FIG. 12), in a case in which the image-capture-range information D is smaller than the size information F, the display zoom magnification z is set to be D/F, and the image that is material data is magnified by D/F (here, the image is reduced because D/F is smaller than one).

In this case, the image-capture object, which is displayed in a size that is F/D times the size of the image-capture object in the real world if magnification (reduction) is not performed in the image processing unit 73, is displayed in a size that is equal to the size of the image-capture object in the real world.

Figure 16:
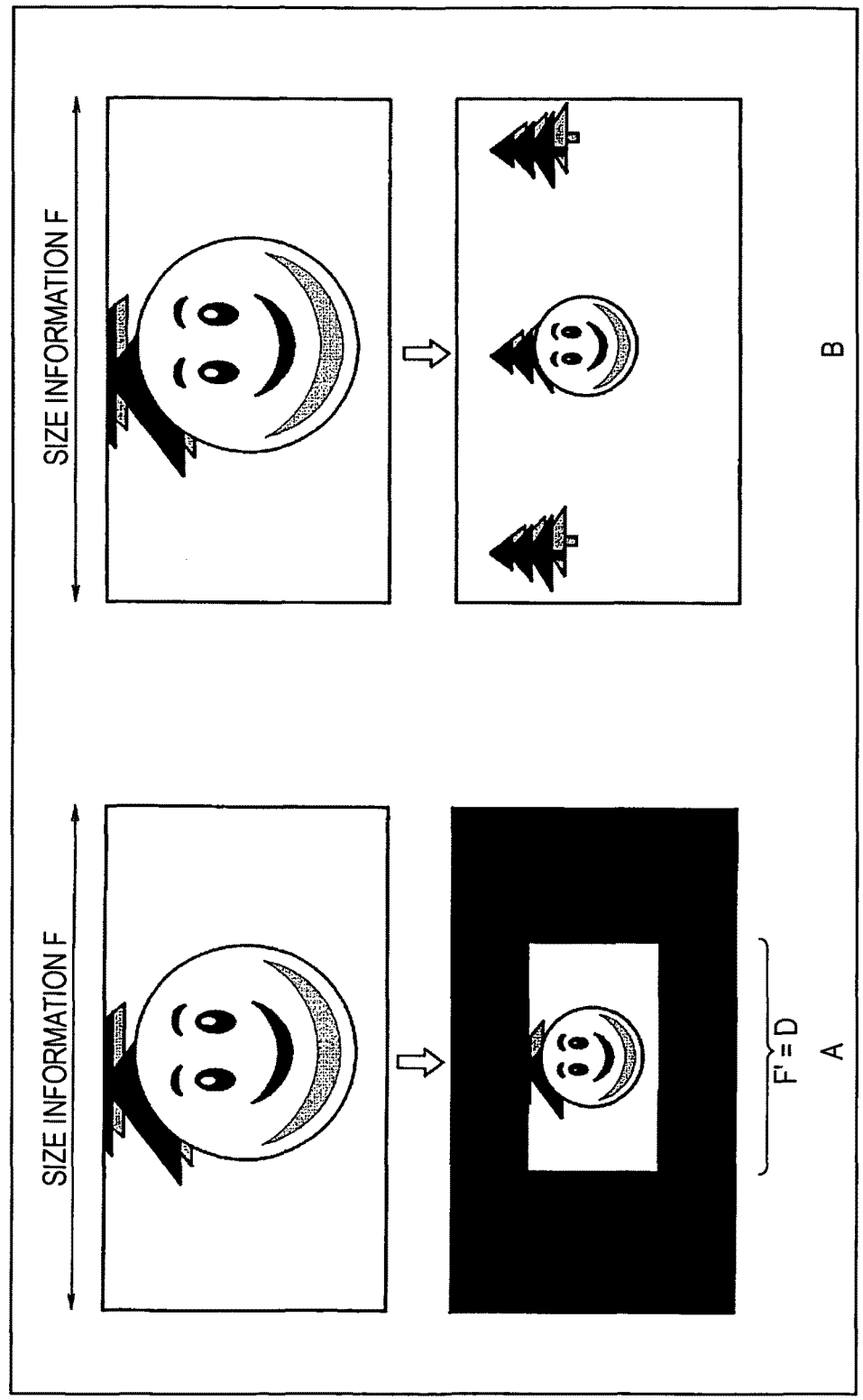
FIG. 16 includes diagrams illustrating images displayed on the output section 55 that is a display device.

FIG. 16 illustrates images displayed on the output section 55, which is a display device, in a case in which the image-capture-range information D is smaller than the size information F.

In other words, part A of FIG. 16 illustrates a display state in which an image that is material data captured using optical zoom is displayed on the output section 55 that is a display device. Part B of FIG. 16 illustrates a display state in which an image that is material data captured using digital zoom is displayed on the output section 55 that is a display device.

In a case in which the image-capture-range information D is smaller than the size information F, the image processing unit 73 sets the display zoom magnification z to be D/F (<1), magnifies the image that is material data by D/F, and supplies the magnified image as output data to the output section 55.

As a result, on the output section 55 that is a display device, the image-capture object is displayed in a size that is equal to the size of the image-capture object in the real world.

Here, in the image processing unit 73, the image that is material data is magnified (reduced) by D/F (<1), and, as a result, an image (output data) that is obtained by the magnification is an image whose horizontal length is equal to the image-capture-range information D.

And, in this case, because the image-capture-range information D is smaller than the size information F, the horizontal length F'(=D) of the image that is output data is smaller than, the size information F, i.e., the horizontal length of the display screen of the output section 55 that is a display device.

For this reason, on the output section 55 that is a display device, black (a so-called black frame) or the like is displayed in a portion of the display screen other than a portion, in which the image that is output data is displayed, of the display screen, for example, as illustrated in part A of FIG. 16.

Note that, when an image that is material data is captured using digital zoom, a portion (a portion shaded with diagonal lines in part A of FIG. 15) (hereinafter, also referred to as a "trimmed portion") of the image, which is captured by the camera, other than the central portion, which is magnified using digital zoom, of the image may remain.

In this case, on the output section 55 that is a display device, the trimmed portion is displayed in a portion of the display screen other than a portion, in which the image that is output data is displayed, of the display screen, for example, as illustrated in part B of FIG. 16.

Next, the reality-mode process that is performed in the image processing unit 73 illustrated in FIG. 12 will be described with reference to FIG. 17.

In step S51, the image processing unit 73 determines a maximum zoom magnification of D/F, which is the maximum value of the display zoom magnification z with which an image that is material data is maximized, on the basis of the image-capture-range information D included in the real-world information that is supplied from the additional-information analyzing unit 72 and the size information F that is characteristics information concerning the output section 55 which is a display device. In addition, the image processing unit 73 sets a criterion zoom magnification $z_1$ that is the display zoom magnification z in a case in which no instruction information is supplied from the input section 56 (FIG. 11). The process proceeds to step S52.

Here, in a case in which the image-capture-range information D is equal to or larger than the size information F, the criterion zoom magnification $z_1$ is set to be one. In case in which the image-capture-range information D is smaller than the size information F, the criterion zoom magnification $z_1$ is set to be the maximum zoom magnification of D/F.

In step S52, the image processing unit 73 determines whether or not instruction information for the zoom instruction has been supplied from the input section 56.

In step S52, when it is determined that no instruction information has been supplied from the input section 56 to the image processing unit 73, the process proceeds to step S53. The image processing unit 73 sets the display zoom magnification z to be the criterion zoom magnification $z_1$. The process proceeds to step S57.

Furthermore, in step S52, when it is determined that instruction information has been supplied from the input section 56 to the image processing unit 73, the process proceeds to step S54. The image processing unit 73 determines whether or not a zoom magnification (hereinafter, also referred to as an instruction zoom magnification A) that is specified in the instruction information supplied from the input section 56 is equal to or lower than the maximum zoom magnification of D/F.

In step S54, when it is determined that the instruction zoom magnification A is equal to or lower than the maximum zoom magnification of D/F, the process proceeds to step S55. The image processing unit 73 sets the display zoom magnification z to be the instruction zoom magnification A. The process proceeds to step S57.

Furthermore, in step S54, when it is determined that the instruction zoom magnification A is not equal to or lower than the maximum zoom magnification of D/F, i.e., when a zoom magnification with which the image-capture object is displayed in a size larger than the size of the image-capture object in the real world and which exceeds the maximum zoom magnification of D/F is specified in the instruction, the process proceeds to step S56. The image processing unit 73 sets the display zoom magnification z to be the maximum zoom magnification of D/F. The process proceeds to step S57.

In step S57, the image processing unit 73 magnifies the image that is stored as material data in the BF 71 only by the display zoom magnification z, thereby generating a magnified image as output data. The image processing unit 73 supplies the magnified image to the output section 55 (FIG. 11) that is a display device.

Then, on the output section 55 that is a display device, the magnified image that is output data supplied from the image processing unit 73 is displayed. In this manner, as described with reference to FIG. 13, the image-capture object is displayed in a size that is F/D times the size of the image-capture object in the real world.

Accordingly, when no instruction information has been supplied from the input section 56 to the image processing unit 73, i.e., when the user has not performed an operation of providing the zoom instruction, the image-capture object is displayed on the output section 55, which is a display device, in a size (z(=D/F)×F/D) that is equal to the size of the image-capture object in the real world or in a size (z(=1)×F/D) that is F/D times the size of the image-capture object in the real world.

In other words, in a case in which the image-capture-range information D is smaller than the size information F, as described above, the criterion zoom magnification $z_1$, and therefore, the display zoom magnification z, is set to be the maximum zoom magnification of D/F. Thus, the image-capture object is displayed in a size that is D/F×F/D times the size of the image-capture object in the real world, i.e., in a size that is equal to the size of the image-capture object in the real world.

Furthermore, in a case in which the image-capture-range information D is equal to or larger than the size information F, as described above, the criterion zoom magnification $z_1$, and therefore, the display zoom magnification z, is set to be one. Thus, the image-capture object is displayed in a size that is F/D (≤1) times the size of the image-capture object in the real world.

In contrast, when instruction information has been supplied from the input section 56 to the image processing unit 73, i.e., when the user has performed an operation of providing the zoom instruction for zoom using the instruction zoom magnification A, in a case in which the instruction zoom magnification A is equal to or lower than the maximum zoom magnification of D/F, the image-capture object is displayed in a size (z(=A)×F/D) that is F/D×A times the size of the image-capture object in the real world. In a case in which the instruction zoom magnification A is not equal to or lower than the maximum zoom magnification of D/F, the image-capture object is displayed in a size (z(=D/F)×F/D) that is equal to the size of the image-capture object in the real world.

In other words, in a case in which the instruction zoom magnification A is equal to or lower than the maximum zoom magnification of D/F, as described above, the display zoom magnification z is set to be the instruction zoom magnification A. Thus, the image-capture object is displayed in a size that is A(≤D/F)×F/D times the size of the image-capture object in the real world.

Furthermore, in a case in which the instruction zoom magnification A is not equal to or lower than the maximum zoom magnification of D/F, as described above, the display zoom magnification z is set to be the maximum zoom magnification of D/F. Thus, the image-capture object is displayed in a size that is D/F×F/D times the size of the image-capture object in the real world, i.e., in a size that is equal to the size of the image-capture object in the real world.

In either case, the image-capture object is displayed in a size that is equal to or smaller than the size of the image-capture object in the real world.

Figure 17:
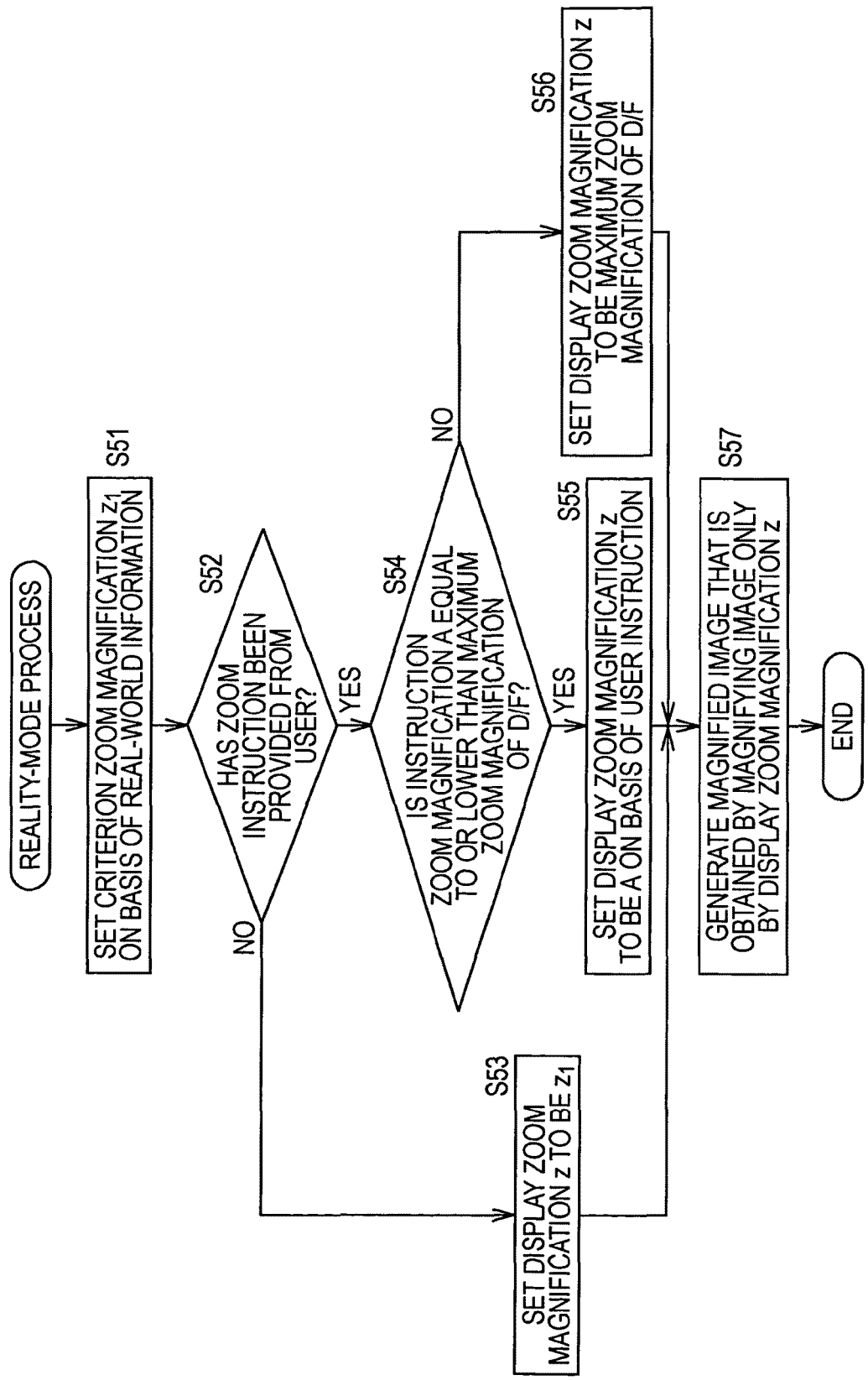
FIG. 17 is a flowchart for explaining the reality-mode process.

Note that the reality-mode process illustrated in FIG. 17 is performed, for example, for each frame (or field).

Additionally, the reality-mode process illustrated in FIG. 17 can be performed only for a case in which the image-capture object is displayed in a size that exceeds the size of the image-capture object in the real world.

In other words, the reality-mode process can be performed, for example, for a case in which the user who has looked at the image-capture object displayed in a size that exceeds the size of the image-capture object in the real world operates the input section 56 so as to provide an instruction for improvement of the display.

Figure 18:
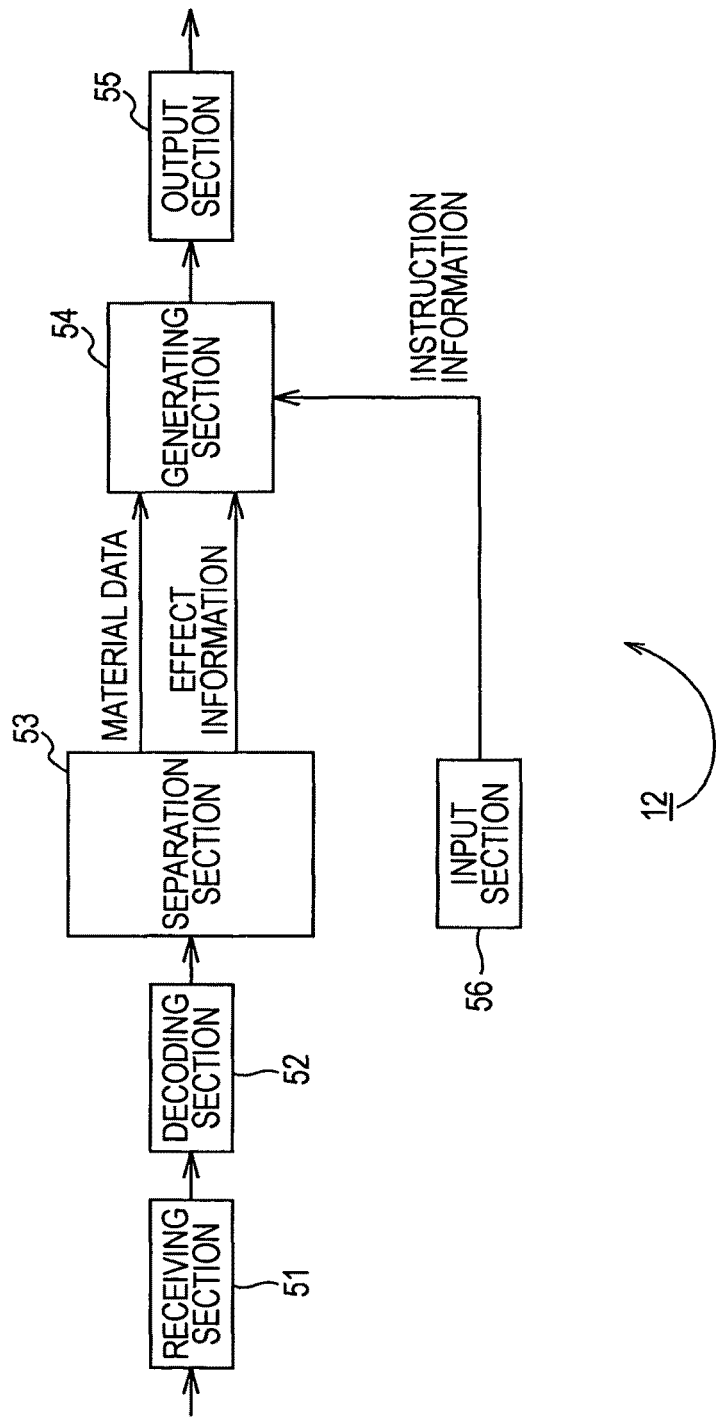
FIG. 18 is a diagram for explaining data that is supplied to the generating section 54 in an entertainment-mode process.

FIG. 18 illustrates data (information) that is supplied to the generating section 54 when the receiving apparatus 12 performs the entertainment-mode process.

In the entertainment-mode process, material data and effect information that is included in additional information are supplied from the separation section 53 to the generating section 54.

Furthermore, in the entertainment-mode process, when the user operates the input section 56 so as to provide an instruction for processing the material data, instruction information corresponding to the operation is supplied from the input section 56 to the generating section 54.

Then, in the entertainment-mode process, the generating section 54 subjects the material data, which has been supplied from the separation section 53, to processing on the basis of the effect information supplied from the separation section 53 or the instruction information supplied from the input section 56, thereby generating output data.

In other words, when no instruction information is supplied from the input section 56 to the generating section 54, the generating section 54 subjects the material data, which has been supplied from the separation section 53, to processing on the basis of the effect information supplied from the separation section 53, thereby generating output data.

Furthermore, when instruction information is supplied from the input section 56 to the generating section 54, the generating section 54 subjects the material data, which has been supplied from the separation section 53, to processing on the basis of the instruction information, thereby generating output data.

Next, for example, supposing that the output section 55 is a display device and output data is an image to be displayed on the output section 55 which is a display device, the entertainment-mode process will be described.

Figure 19:
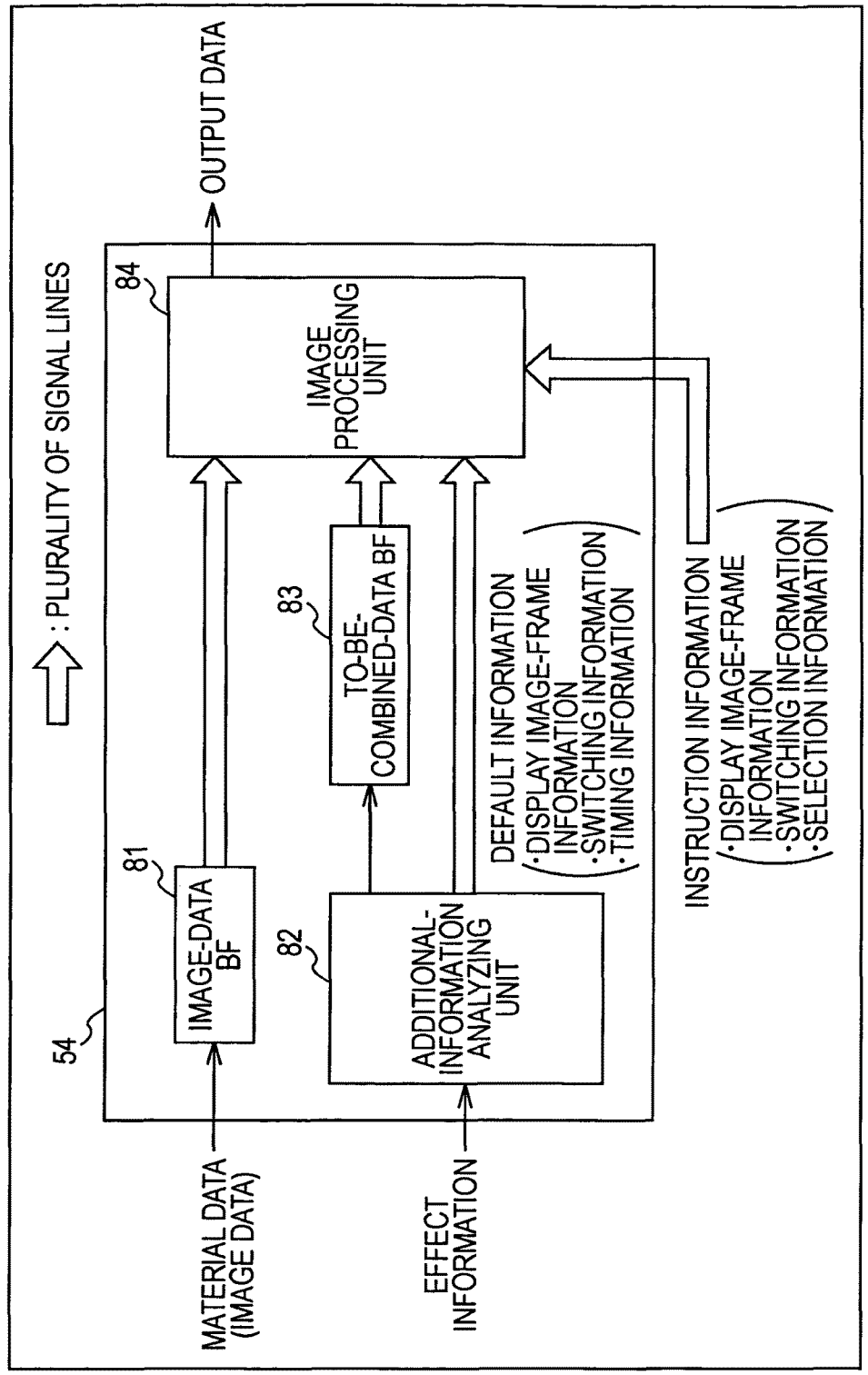
FIG. 19 is a block diagram illustrating an example of a configuration of the generating section 54 that performs the entertainment-mode process.

FIG. 19 illustrates an example of a configuration of the generating section 54 in a case in which the receiving apparatus 12 performs the entertainment-mode process.

Here, it is supposed that switching information, display image-frame information, and data used for combining, which are described with reference to FIGS. 3 to 6, are included in effect information. It is supposed that the N streams of images S#1 to S#N exist as pieces of material data.

Figure 20:
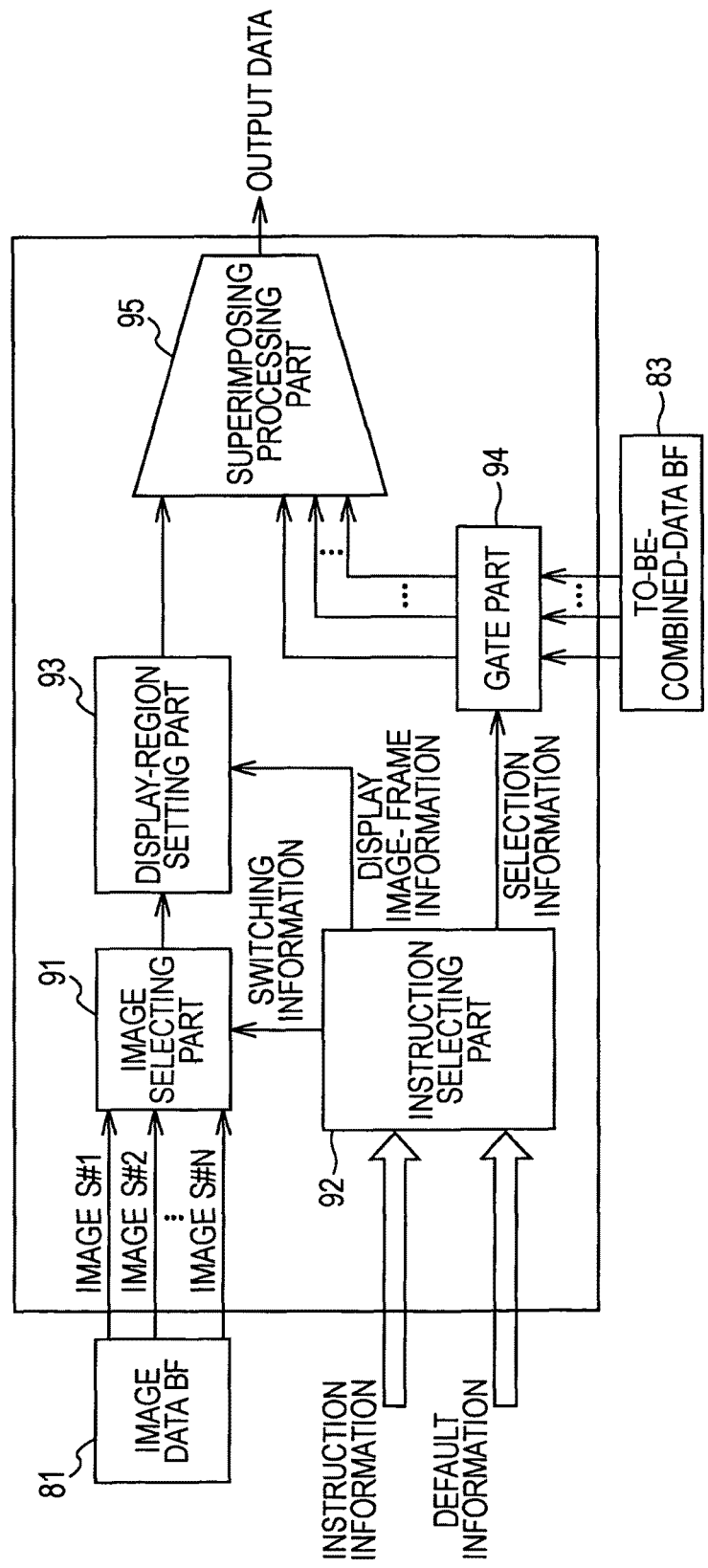
FIG. 20 is a block diagram illustrating an example of a configuration of an image processing unit 84.

In FIG. 20, the generating section 54 includes an image-data BF (buffer) 81, an additional-information analyzing unit 82, a to-be-combined-data BF 83, and an image processing unit 84.

The N streams of images S#1 to S#N that are pieces of material data are supplied from the separation section 53 (FIG. 18) to the image-data BF 81. The image-data BF 81 stores the N streams of images S#1 to S#N that are pieces of material data supplied from the separation section 53.

Effect information included in additional information is supplied from the separation section 53 to the additional-information analyzing unit 82.

The additional-information analyzing unit 82 analyzes the effect information, which has been supplied from the separation section 53, to extract, for example, switching information, display image-frame information, and data used for combining that are included in the effect information.

Further, the additional-information analyzing unit 82 extracts to-be-combined data, which is to be combined with the pieces of material data, and timing information, which indicates a timing at which the combining is performed, from the data used for combining.

Then, the additional-information analyzing unit 82 supplies the to-be-combined data to the to-be-combined-data BF 83. In addition, the additional-information analyzing unit 82 supplies the switching information, the display image-frame information, and the timing information to the image processing unit 84.

Here, the switching information, the display image-frame information, and the timing information that the additional-information analyzing unit 82 supplies to the image processing unit 84, i.e., the switching information, the display image-frame information, and the timing information that are included in the effect information, are collectively referred to as default information.

The to-be-combined-data BF 83 stores the to-be-combined data supplied from the additional-information analyzing unit 82.

The default information is supplied from the additional-information analyzing unit 82 to the image processing unit 84 as described above. Further, the N streams of images S#1 to S#N that are pieces of material data stored in the image-data BF 81 are supplied to the image processing unit 84. In addition, the to-be-combined data stored in the to-be-combined-data BF 83 is supplied to the image processing unit 84.

Moreover, when the user operates the input section 56 (FIG. 18) so as to provide an instruction for processing the pieces of material data and so forth, instruction information corresponding to the operation is supplied from the input section 56 to the image processing unit 84.

Here, the user operates the input section 56, whereby the user can provide an instruction (hereinafter, also referred to as a PTZ (pan, tilt, and zoom) instruction) with which the camera capturing an image displayed on the output section 55 (FIG. 18), which is a display device, looks as if the camera were subjected to the pan operation, the tilt operation, or the zoom operation.

Further, the user operates the input section 56, whereby the user can provide an instruction (hereinafter, also referred to as a switching instruction) for switching an image displayed on the output section 55, which is a display device, from one stream of images S#i to another stream of images S#i' among the N streams of images S#1 to S#N that are pieces of material data.

Additionally, the user operates the input section 56, whereby the user can provide an instruction (hereinafter, also referred to as a combining instruction) for combining (superimposing) the to-be-combined data with (on) an image displayed on the output section 55 that is a display device.

When the user provides the PTZ instruction by operating the input section 56, the display region (FIG. 5) is moved or the size of the display region is changed in accordance with the PTZ instruction. The input section 56 generates display image-frame information with which the display region is specified, and supplies instruction information including the display image-frame information to the image processing unit 84.

Moreover, when the user provides the switching instruction by operating the input section 56, the input section 56 generates switching information (FIG. 4) in accordance with the switching instruction, and supplies instruction information including the switching information to the image processing unit 84.

Further, when the user provides the combining instruction by operating the input section 56, the input section 56 generates selection information for selecting to-be-combined data, which is to be combined with the pieces of material data, in accordance with the combining instruction, and supplies instruction information including the selection information to the image processing unit 84.

The image processing unit 84 subjects the pieces of material data, which are stored in the image-data BF 81, to processing using the to-be-combined data, which is stored in the to-be-combined-data BF 83, on the basis of the default information supplied from the additional-information analyzing unit 82 or instruction information supplied from the input section 56 on an as-needed basis, thereby generating an image that is output data. The image processing unit 84 supplies the image to the output section 55 (FIG. 18) that is a display device.

In other words, when no instruction information is supplied from the input section 56 to the image processing unit 84, the image processing unit 84 subjects the pieces of material data, which are stored in the image-data BF 81, to processing on the basis of the default information supplied from the additional-information analyzing unit 82, thereby generating an image that is output data.

Specifically, for example, the image processing unit 84 selects, as an image (hereinafter, also referred to as an image used for output) that is used as output data, one stream of images from among the N streams of images S#1 to S#N, which are pieces of material data stored in the image-data BF 81, on the basis of the switching information included in the default information.

Further, for example, the image processing unit 84 extracts an image corresponding to the display region indicated by the display image-frame information from the image used for output on the basis of the display image-frame information included in the default information.

Moreover, for example, the image processing unit 84 combines the to-be-combined data, which is stored in the to-be-combined-data BF 83, with the image corresponding to the display region on the basis of the timing information included in the default information. Note that, here, when a plurality of pieces of to-be-combined data are stored in the to-be-combined-data BF 83, it is supposed that information concerning which piece of to-be-combined data among the plurality of pieces of to-be-combined data will be combined with the image corresponding to the display region is included in the timing information included in the default information.

As described above, when no instruction information is supplied from the input section 56 to the image processing unit 84, material data is processed in the image processing unit 84 on the basis of the default information supplied from the additional-information analyzing unit 82, i.e., (the switching information, the display image-frame information, and the timing information included in) the effect information generated by the editing device 32 (FIG. 2) of the sending apparatus 11. Thus, an image that is obtained by editing which is performed by operating the editing device 32 with the program producer is displayed on the output section 55 that is a display device.

In contrast, when instruction information is supplied from the input section 56 to the image processing unit 84, the image processing unit 84 subjects the pieces of material data, which are stored in the image-data BF 81, to processing on the basis of the instruction information, thereby generating an image that is output data.

Specifically, for example, when switching information is included in the instruction information, the image processing unit 84 selects, as an image used for output, one stream of images from among the N streams of images S#1 to S#N, which are pieces of material data stored in the image-data BF 81, on the basis of the switching information included in the instruction information instead of the switching information included in default information.

Additionally, for example, when display image-frame information is included in the instruction information, the image processing unit 84 extracts an image corresponding to the display region indicated by the display image-frame information from the image used for output on the basis of the display image-frame information included in the instruction information instead of the display image-frame information included in the default information.

Further, for example, when selection information is included in the instruction information, the image processing unit 84 selects a piece of to-be-combined data, which is to be combined with the image corresponding to the display region, from among pieces of to-be-combined data, which are stored in the to-be-combined-data BF 83, in accordance with the selection information included in the instruction information instead of the timing information included in the default information. The image processing unit 84 combines the piece of to-be-combined data with the image corresponding to the display region.

Note that, in a case of selecting to-be-combined data using timing information or selection information, a plurality of pieces of to-be-combined data (such as a plurality of subtitles, or one subtitle and one PinP image) may be selected.

Furthermore, selection information may indicate that no to-be-combined data is to be selected. In a case in which selection information indicates that no to-be-combined data is to be selected, even when the timing information included in the default information indicates that certain to-be-combined data is to be combined with the image corresponding to the display region, combining of the to-be-combined data is not performed in the image processing unit 84.

As described above, when instruction information is supplied from the input section 56 to the image processing unit 84, the image processing unit 84 subjects the pieces of the material data, which are stored in the image-data BF 81, to processing on the basis of the instruction information instead of the default information, thereby generating an image that is output data.

Note that, when supply of instruction information is stopped after supply of the instruction information from the input section 56 to the image processing unit 84 is performed, the image processing unit 84 subjects the pieces of the material data, which are stored in the image-data BF 81, to processing on the basis of the default information, thereby generating an image that is output data.

Accordingly, for example, in a case in which timing information indicates that a subtitle serving as certain to-be-combined data is to be combined with the image corresponding to the display region, when the user operates the input section 56 so as to disable (so as not to perform) combining of the to-be-combined data, the subtitle is not displayed in accordance with the operation that is performed on the input section 56.

Then, after that, when the user operates the input section 56 so as to cancel disabling of combining of the to-be-combined data, the subtitle is combined with the image corresponding to the display region in accordance with the timing information included in the default information, and is displayed.

Note that, in the generating section 54 illustrated in FIG. 19, real-world information can be supplied from the separation section 53 to the image processing unit 84. In addition, characteristics information can be supplied from the output section 55 to the image processing unit 84. In the image processing unit 84, the reality-mode process can be further performed as in the image processing unit 73 illustrated in FIG. 12.

In other words, when no instruction information is supplied from the input section 56 to the image processing unit 84, the processes in steps S51, S53, and S57 included in the reality-mode process illustrated in FIG. 17 can be performed in the image processing unit 84. In this case, in the image processing unit 84, an image that is output data is generated so that the size (physical amount) of the image-capture object recognized from display on (output of) the output section 55 which is a display device will be identified as being a size (the size of the image-capture object in the real world) indicated by the image-capture-range information D included in the real-world information.

Next, FIG. 20 illustrates an example of a configuration of the image processing unit 84 illustrated in FIG. 19.

In FIG. 20, the image processing unit 84 includes an image selecting part 91, an instruction selecting part 92, a display-region setting part 93, a gate part 94, and a superimposing processing part 95.

The N streams of images S#1 to S#N that are pieces of material data stored in the image-data BF 81 are supplied to the image selecting part 91.

Furthermore, default information is supplied from the additional-information analyzing unit 82 (FIG. 19) to the instruction selecting part 92. In addition, instruction information is supplied from the input section 56 (FIG. 18) to the instruction selecting part 92.

The instruction selecting part 92 supplies switching information included in the default information, which has been supplied from the additional-information analyzing unit 82, to the image selecting part 91. In addition, the instruction selecting part 92 supplies display image-frame information included in the default information to the display-region setting part 93.

Moreover, the instruction selecting part 92 generates, on the basis of timing information included in the default information, selection information for selecting to-be-combined data, which is used for combining, at a timing at which the to-be-combined data should be combined. The instruction selecting part 92 supplies the selection information to the gate part 94.

However, when instruction information is supplied from the input section 56 (FIG. 18) to the instruction selecting part 92, the instruction selecting part 92 preferentially selects the instruction information.

In other words, when instruction information is supplied from the input section 56 to the instruction selecting part 92 and switching information is included in the instruction information, the instruction selecting part 92 supplies the switching information included in the instruction information instead of the switching information included in the default information to the image selecting part 91.

Furthermore, when instruction information is supplied from the input section 56 to the instruction selecting part 92 and display image-frame information is included in the instruction information, the instruction selecting part 92 supplies the display image-frame information included in the instruction information instead of the display image-frame information included in the default information to the display-region setting part 93.

Further, when instruction information is supplied from the input section 56 to the instruction selecting part 92 and selection information is included in the instruction information, the instruction selecting part 92 supplies the selection information included in the instruction information instead of the selection information generated from the timing information included in the default information to the gate part 94.

The image selecting part 91 selects, as an image used for output, on the basis of the switching information supplied from the instruction selecting part 92, one stream of images from among the N streams of images S#1 to S#N, which are pieces of material data supplied from the image-data BF 81. The image selecting part 91 outputs the image used for output to the display-region setting part 93.

The display-region setting part 93 extracts an image corresponding to the display region indicated by the display image-frame information, which has been supplied from the instruction selecting part 92, from the image used for output, which has been supplied from the image selecting part 91. The display-region setting part 93 supplies the image corresponding to the display region to the superimposing processing part 95.

Meanwhile, the selection information is supplied from the instruction selecting part 92 to the gate part 94 as described above. In addition, pieces of to-be-combined data stored in the to-be-combined-data BF 83 are supplied to the gate part 94.

The gate part 94 selects zero or more pieces of to-be-combined data from among the pieces of to-be-combined data, which are stored in the to-be-combined-data BF 83, in accordance with the selection information supplied from the instruction selecting part 92. The gate part 94 supplies the selected pieces of to-be-combined data to the superimposing processing part 95.

The superimposing processing part 95 combines (superimposes) the zero or more pieces of to-be-combined data, which have been supplied from the gate part 94, with (on) the image corresponding to the display region, which has been supplied from the display-region setting part 93. The superimposing processing part 95 supplies the combined image as output data to the output section 55 (FIG. 18).

Note that, when zero pieces of to-be-combined data are supplied, i.e., when no to-be-combined data is supplied, from the gate part 94 to the superimposing processing part 95, the superimposing processing part 95 supplies the image corresponding to the display region, which has been supplied from the display-region setting part 93, as output data to the output section 55 without performing any process on the image corresponding to the display region.

Figure 21:
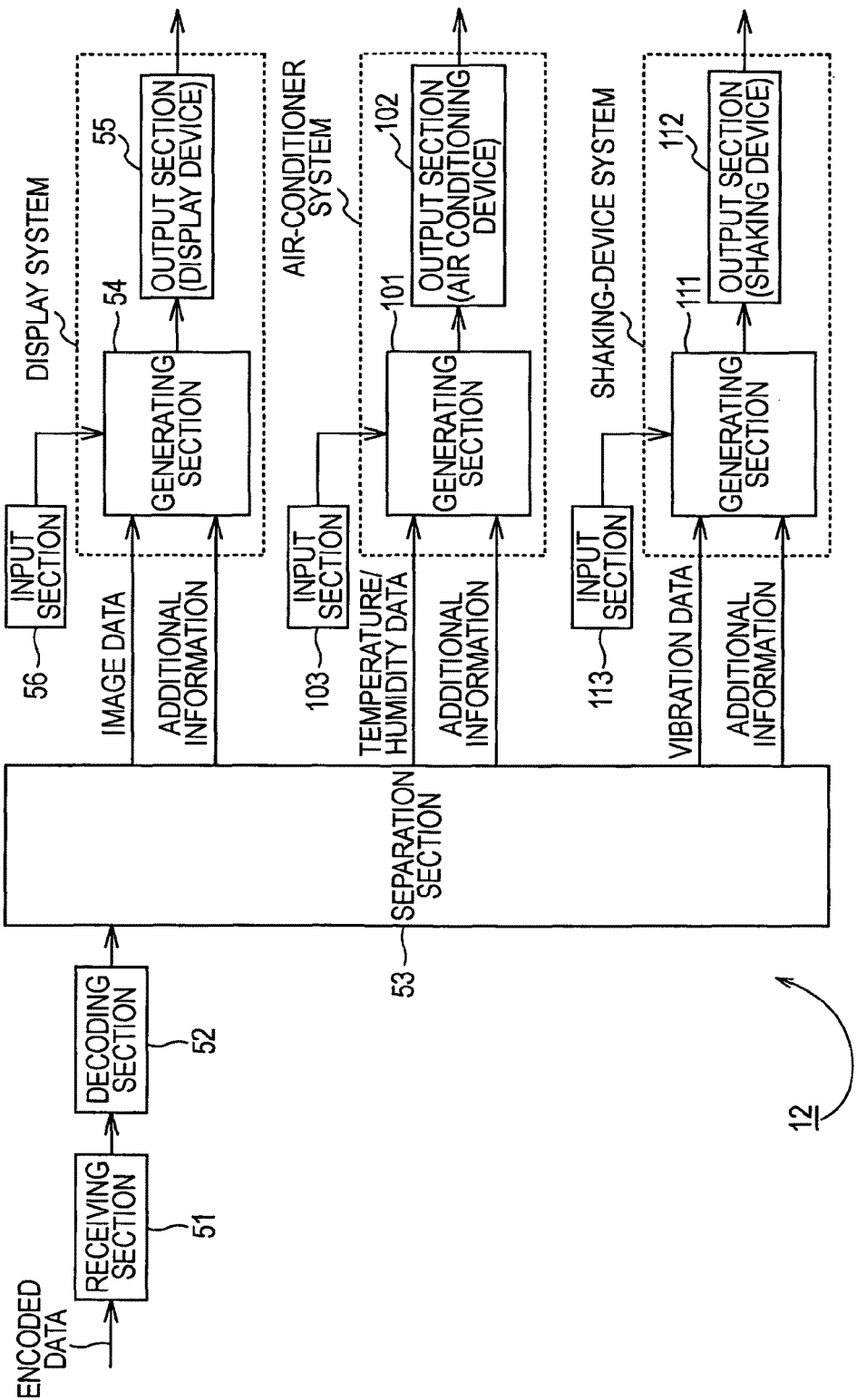
FIG. 21 is a block diagram illustrating an example of another configuration of the receiving apparatus 12.

Next, FIG. 21 illustrates an example of another configuration of the receiving apparatus 12 illustrated in FIG. 1.

Note that, in the drawing, elements corresponding to those illustrated in FIG. 9 are denoted by the same reference numerals, and, hereinafter, a description thereof is appropriately omitted.

As illustrated in FIG. 2, in the sending apparatus 11, various types of sensors, such as a camera that senses light and that outputs an image, a temperature sensor that senses a temperature, a humidity sensor that senses a humidity, an air-flow-speed sensor that senses an air-flow speed, a vibration sensor that senses a vibration, and a brightness sensor that senses a brightness, can be employed as the sensor section 31.

When, for example, a camera, a temperature sensor, a humidity sensor, and a vibration sensor are employed as the sensor section 31 in the sending apparatus 11, each of a piece of data concerning an image acquired by the camera, a piece of data concerning a temperature acquired by the temperature sensor, a piece of data concerning a humidity acquired by the humidity sensor, and a piece of data concerning a vibration acquired by the vibration sensor is sent together with a corresponding one of pieces of additional information.

In this case, the separation section 53 of the receiving apparatus 12 separates data that is supplied from the decoding section 52 individually into the piece of data concerning the image, the piece of data concerning the temperature, the piece of data concerning the humidity, and the piece of data concerning the vibration, which are pieces of material data, and the pieces of additional information corresponding to the individual pieces of material data as illustrated in FIG. 21.

Then, the separation section 53 supplies the piece of data concerning the image, which is a piece of material data, and the corresponding piece of additional information to the generating section 54.

Furthermore, the separation section 53 supplies the piece of data concerning the temperature and the piece of data concerning the humidity, which are pieces of material data, and the corresponding pieces of additional information to a generating section 101. In addition, the separation section 53 supplies the piece of data concerning the vibration, which is a piece of material data, and the corresponding piece of additional information to a generating section 111.

As described above, the generating section 54 processes, on the basis of the piece of data concerning the image that is a piece of material data supplied from the separation section 53 and the piece of additional information or a piece of instruction information that has been supplied from the input section 56, the piece of material data, thereby generating an image that is a piece of output data. The generating section 54 supplies the piece of output data to the output section 55.

The output section 55 is, for example, a display device as described above, and performs (produces) display (output) of the image on the basis of the piece of output data supplied from the generating section 54.

Meanwhile, the piece of data concerning the temperature and the piece of data concerning the humidity, which are pieces of material data, and the corresponding pieces of additional information are supplied from the separation section 53 to the generating section 101. In addition, a piece of instruction information is supplied from an input section 103, which is operated by the user as in the case of the input section 56, to the generating section 101.

The generating section 101 processes, on the basis of the piece of data concerning the temperature and the piece of data concerning the humidity that are pieces of material data supplied from the separation section 53 and the pieces of additional information or the piece of instruction information that has been supplied from the input section 103, the pieces of material data, thereby generating a piece of output data. The generating section 101 supplies the piece of output data to an output section 102.

In other words, the output section 102 is, for example, an air conditioning device such as an air conditioner. The generating section 101 processes the piece of data concerning the temperature and the piece of data concerning the humidity, thereby generating a piece of air-conditioning control information for controlling the output section 102 that is an air conditioning device. The generating section 101 outputs the piece of air-conditioning control information as a piece of output data to the output section 102.

The output section 102 outputs an air flow (air) having an air-flow direction, a temperature, an air-flow speed, a humidity, and so forth that are adjusted on the basis of the piece of air-conditioning control information which is a piece of output data supplied from the generating section 101.

Furthermore, the piece of data concerning the vibration, which is a piece of material data, and the corresponding piece of additional information are supplied from the separation section 53 to the generating section 111. In addition, a piece of instruction information is supplied from an input section 113, which is operated by the user as in the case of the input section 56, to the generating section 111.

The generating section 111 processes, on the basis of the piece of data concerning the vibration that is a piece of material data supplied from the separation section 53 and the piece of additional information or the piece of instruction information that has been supplied from the input section 113, the piece of material data, thereby generating a piece of output data. The generating section 111 supplies the piece of output data to an output section 112.

In other words, the output section 112 is, for example, a chair or a shaking device that shakes (vibrates) the output section 55 which is a display device. The generating section 111 processes the piece of data concerning the vibration, thereby generating a piece of vibration information for controlling the output section 112 that is a shaking device. The generating section 111 outputs the piece of vibration information as a piece of output data to the output section 112.

The output section 112 shakes the chair or the like on the basis of the piece of vibration information that is a piece of output data supplied from the generating section 111.

In addition, for example, the sending apparatus 11 can send, as a piece of material data, a piece of data concerning a brightness acquired by a brightness sensor, which senses a brightness, together with a corresponding piece of additional information. In this case, the receiving apparatus 12 can adjust, on the basis of a piece of output data that is generated from the piece of material data and the piece of additional information, for example, illumination provided by an illumination device provided in a room where the receiving apparatus 12 is placed.

Furthermore, for example, the sending apparatus 11 can send, as a piece of material data, a piece of data concerning an air-flow speed acquired by an air-flow-speed sensor, which senses an air-flow speed, together with a corresponding piece of additional information. In this case, the receiving apparatus 12 can adjust, on the basis of a piece of output data that is generated from the piece of material data and the piece of additional information, the air-flow speed of an air flow that is output by the output section 102 which is an air conditioning device.

As described above, the sending apparatus 11 sends pieces of material data concerning an image, a temperature, a humidity, an air-flow speed, a vibration, a brightness, and so forth acquired by the sensor section 31 together with corresponding pieces of additional information. The receiving apparatus 12 generates pieces of output data on the basis of the pieces of the material data and the pieces of additional information. The display device, the air conditioning device, the shaking device, the illumination device, and so forth, which produce output, produce output on the basis of the pieces of output data, thereby realistically reproducing a landscape in an environment where the pieces of material data were acquired by the sensor section 31, the temperature, the air-flow speed, the humidity, the vibration, the brightness, and so forth, so that the user can experience the sense of realism.

Next, the series of processes described above can also be performed by hardware, and can also be performed by software. In a case in which the series of processes is performed by software, a program configuring the software is installed into a general-purpose computer or the like.

Figure 22:
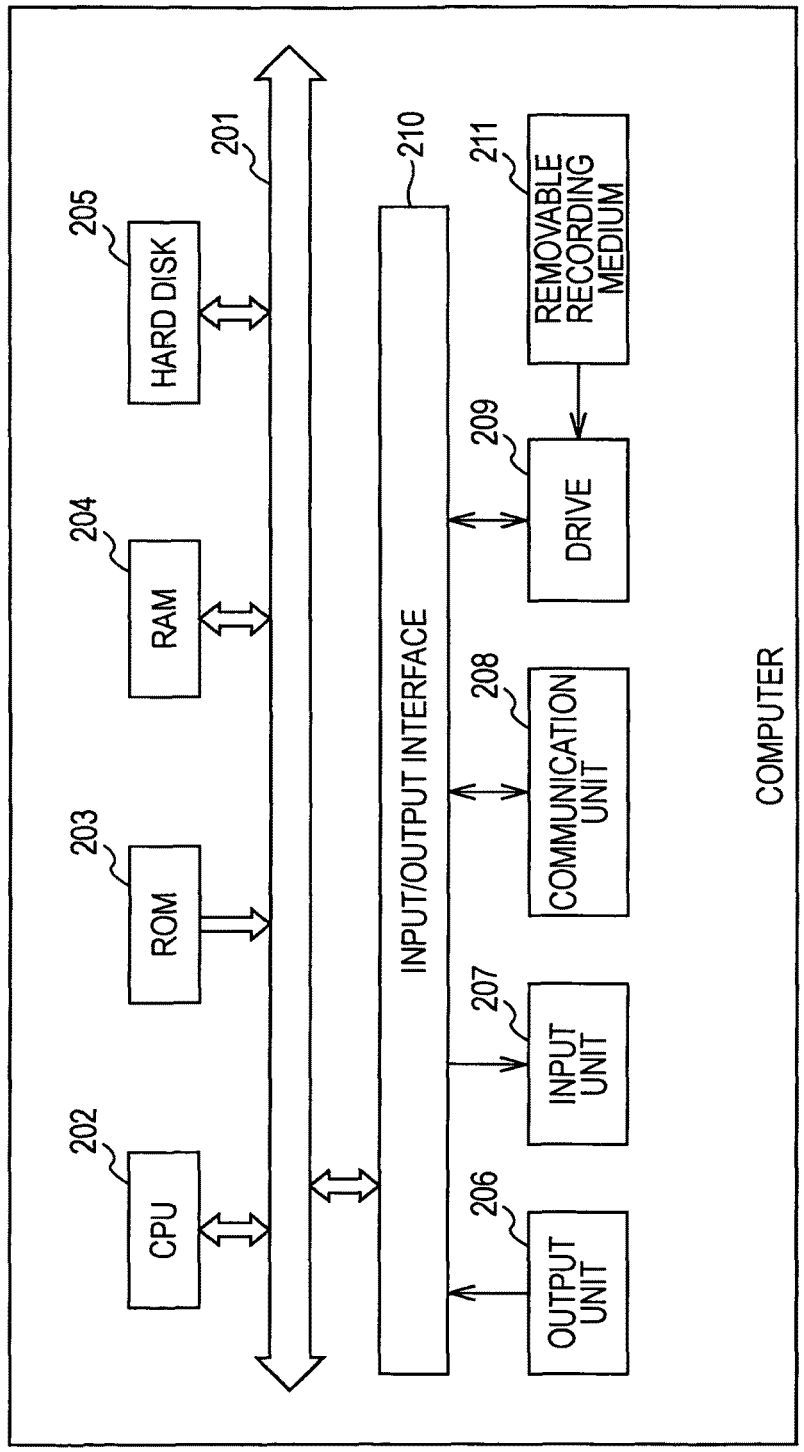
FIG. 22 is a block diagram illustrating an example of a configuration of an embodiment of a computer system to which the present invention is applied.

Hence, FIG. 22 illustrates an example of a configuration of an embodiment of a computer into which the program that performs the series of processes described above is installed.

The program can be recorded in advance on a hard disk 205 or a ROM 203 serving as a recording medium incorporated in the computer.

Alternatively, the program can be temporarily or permanently stored (recorded) on a removable recording medium 211 such as a flexible disk, a CD-ROM (Compact Disc Read Only Memory), an MO (Magneto Optical) disk, a DVD (Digital Versatile Disc), a magnetic disk, or a semiconductor memory. The removable recording medium 211 of this type can be provided as so-called packaged software.

Note that the program is installed into the computer from the removable recording medium 211 as described above. Otherwise, the program can be transferred to the computer from a download site via an artificial satellite for digital satellite broadcasting in a wireless manner or can be transferred to the computer via a network, such as a LAN (Local Area Network) or the Internet, in a wired manner. In the computer, the program transferred in such a manner can be received by a communication unit 208 and installed into the hard disk 205 incorporated therein.

The computer incorporates therein a CPU (Central Processing Unit) 202. The CPU 202 is connected to an input/output interface 210 via a bus 201. When an instruction is input to the CPU 202 via the input/output interface 210 by operating an input unit 207, which is configured using a keyboard, a mouse, a microphone, or the like, with the user, the CPU 202 executes the program stored in the ROM (Read Only Memory) 203 in accordance with the instruction. Alternatively, the CPU 202 loads, into a RAM (Random Access Memory) 204, the program stored on the hard disk 205, the program that is transferred from a satellite or a network, that is received by the communication unit 208, and that is installed onto the hard disk 205, or the program that is read from the removable recording medium 211 mounted in a drive 209 and that is installed onto the hard disk 205. The CPU 202 executes the program. In this manner, the CPU 202 performs the processes according to the flowcharts described above or the processes performed with the configurations illustrated in the above-described block diagrams. Then, on an as-needed basis, for example, via the input/output interface 210, the CPU 202 outputs a result of the processes from an output unit 206 that is configured using an LCD (Liquid Crystal Display), a speaker, or the like, or sends the result from the communication unit 208, and, further, causes the hard disk 205 to record the result.

Here, in the present specification, process steps describing the program for causing the computer to perform various processes may not necessarily be processed in chronological order described as the flowcharts, and include processes performed in parallel or individually (for example, parallel processes or object-based processes).

Furthermore, the program may be processed by one computer or be subjected to distributed processing by a plurality of computers. Further, the program may be transferred to a remote computer and executed thereby.

As described above, in the broadcasting system illustrated in FIG. 1, the sending apparatus 11 sends material data acquired by the sensor section 31 and corresponding additional information. Because the receiving apparatus 12 generates output data on the basis of the material data and the additional information and produces output on the basis of the output data, an appropriate process can be performed on the receiving apparatus 12 side, thereby making it possible, for example, to cause a user to feel the sense of realism or to display an image suitable for the preference of a user.

In other words, in the receiving apparatus 12, the reality-mode process can be performed as the appropriate process. With the reality-mode process, for example, the image-capture object is displayed in a size that is larger than the size of the image-capture object in the real world, whereby the reality can be prevented from being lost.

Specifically, for example, so to speak, a mismatch, such as a display of a face of a person in a size that is larger than the actual size of the face, is removed, so that a user can be caused to feel the sense of realism.

Note that, when a display device having a large display screen (for example, 100 inches or larger) is employed as the output section 55 in the reality-mode process, an image can be displayed so that the image looks, so to speak, borrowed scenery.

Furthermore, the reality-mode process is particularly useful for, for example, a case in which an image of a landscape or a piece of music played by an orchestra is provided as material data.

In other words, for example, data concerning an image of an actual landscape is acquired by a camera serving as the sensor, and the reality-mode process is performed on the data concerning the image, using the data concerning the image as material data, whereby an image of trees, an mountain, and so forth that constitute the landscape can be displayed in a size that causes a user to feel as if the user were looking at the landscape at a place where the user could see the actual landscape.

Furthermore, for example, data concerning a piece of music actually played by an orchestra is acquired by a microphone serving as the sensor, and the reality-mode process is performed on the data concerning the piece of music, using the data concerning the piece of music as material data, whereby a piece of music (audio) can be output at an audio volume that causes a user to feel as if the user were listening to the piece of music played by the orchestra in a venue where the piece of music was actually played.

Further, in the receiving apparatus 12, the entertainment-mode process can be performed as the appropriate process. With the entertainment-mode process, for example, an image suitable for the preferences of a user can be displayed.

In other words, with the entertainment-mode process, removal of an emphasis effect that was applied by a program producer in editing and that is unnecessary for a user, addition of an emphasis effect suitable for the preferences of the user, selection of information, deformed display, and so forth can be realized.

Specifically, for example, in the entertainment-mode process, when a user operates the input section 56, thereby providing a combining instruction, selection information for selecting to-be-combined data, which is to be combined with material data, is generated in the input section 56 in accordance with the combining instruction. In the image processing unit 84 (FIG. 19), selection (or non-selection) of to-be-combined data, such as a subtitle (telop) or a PinP image, which is to be combined with an image, is performed in accordance with the selection information.

Accordingly, a user who feels that the number of telops or PinP images is large, e.g., that emphasis effects using telops and PinP images are unnecessary in a news program, operates the input section 56, whereby the user can watch the news program in a state in which no telop or PinP image exists.

Furthermore, for example, in the entertainment-mode process, when a user operates the input section 56, thereby providing the PTZ instruction, display image-frame information for specifying the display region (FIG. 5) is generated in the input section 56 in accordance with the PTZ instruction. In the image processing unit 84 (FIG. 19), an image corresponding to the display region indicated by the display image-frame information is extracted from material data.

Accordingly, in a sports program or a music program, a user who is a fan of a specific player or celebrity operates the input section 56, whereby the user can watch an image that is obtained by following the specific player or celebrity.

Note that, as described above, when instruction information is supplied from the input section 56 to the image processing unit 84 (FIG. 19), the image processing unit 84 preferentially selects the instruction information. The image processing unit 84 processes material data on the basis of the instruction information, thereby displaying an image suitable for the preferences of a user. However, when no instruction information is supplied from the input section 56 to the image processing unit 84, material data is processed on the basis of the default information, i.e., (switching information, display image-frame information, and timing information included in) effect information that is generated by the editing device 32 of the sending apparatus 11.

Accordingly, a user operates the input section 56, whereby the user can cause the output section 55, which is a display device, to display an image suitable for the preferences of the user. The user does not operate the input section 56 (the user operates the input section 56 so that the PTZ instruction, the switching instruction, or the combining instruction that was provided by operating the input section 56 is cancelled), whereby the user can cause the output section 55, which is a display device, to display an image obtained by editing which was performed by operating the editing device 32 with a program producer.

Note that the embodiments of the present invention are not limited to the above-described embodiments. Various modifications can be made without departing from the gist of the present invention.

The invention claimed is:

1. A broadcasting system, comprising:
   a sending apparatus that sends data; and
   a receiving apparatus that receives the data;
   the sending apparatus including:
   editing means for generating, based on material data acquired by a sensor, at least one of (i) real-world information indicating a physical amount, in the real world, of a target sensed by the sensor as additional information to be used to carry out a reality-mode process on the material data at the receiving apparatus or (ii) effect information as additional information to be used to carry out an entertainment-mode process on the material data at the receiving apparatus, and
   sending means for sending the material data and the additional information;
   the receiving apparatus including:
   receiving means for receiving the material data and the additional information,
   generating means for generating output data based on the material data and the additional information, and
   output means for producing output based on the output data,
   wherein the material data includes pieces of material data, the pieces of material data are derived from a plurality of streams of moving images, the effect information includes switching information for switching among images to be displayed on a display device by selecting a time code, for each one of the pieces of material data, one or more images from an associated one of the plurality of streams of moving images, and the generating means generates the output data based on the switching information, the output data including the images to be displayed by the display device.

2. The broadcasting system according to claim 1, wherein the additional information includes the real-world information indicating a physical amount in the real world, and the generating means generates the output based on the material data, the real-world information, and characteristics information indicating characteristics of the output means so that a physical amount recognized from the output produced by the output means is identified as being the physical amount indicated by the real-world information.

3. The broadcasting system according to claim 2, wherein the sensor includes image-capture means for capturing an image, the material data includes an image captured by the image-capture means, the output means includes a display device that displays an image, the output data includes an image displayed by the display device, the real-world information includes image-capture-range information indicating an image-capture range of the image-capture means, and the characteristics information includes size information indicating a size of a display screen in which the display device displays an image.

4. The broadcasting system according to claim 3, wherein the generating means generates an image as the output data based on the image which includes the material data, the image-capture-range information which includes the real-world information, and the size information which includes the characteristics information so that a size of an object recognized from the image displayed by the display device does not exceed a size of the object in the real world.

5. The broadcasting system according to claim 3, wherein the generating means generates an image, which includes the output data, based on the image which includes the material data, the image-capture-range information which includes the real-world information, and the size information which includes the characteristics information so that a size of an object recognized from the image displayed by the display device is identified as being a size of the object in the real world.

6. The broadcasting system according to claim 2, wherein the sending means sends a plurality of types of material data that are acquired by a plurality of types of sensors and pieces of additional information corresponding to the plurality of individual types of material data, and the receiving apparatus includes:

the receiving means, a plurality of types of generating means for individually generating a plurality of types of output data based on the plurality of types of material data and the pieces of additional information corresponding to the plurality of types of material data, and a plurality of types of output means for producing output based on the plurality of types of output data.

7. The broadcasting system according to claim 6, wherein one predetermined type of output means among the plurality of types of output means includes air conditioning means, one predetermined type of output data among the plurality of types of output data includes data concerning a temperature or an air-flow speed, and the air conditioning means produces, based on the data concerning a temperature or an air-flow speed, output for reproducing a temperature or an air-flow speed in an environment in which the plurality of types of material data were acquired by the plurality of types of sensors.

8. The broadcasting system according to claim 1, wherein the additional information includes the effect information that is used to process the material data, and the generating means generates the output data by subjecting the material data to processing based on the effect information.

9. The broadcasting system according to claim 8, the receiving apparatus further includes instruction input means for accepting a processing instruction that is provided by a user, and the generating means subjects, based on the effect information or instruction information concerning the processing instruction that is provided by the user, the material data to processing that is desired by the user.

10. The broadcasting system according to claim 9, wherein the sensor includes image-capture means for capturing an image, the material data includes an image captured by the image-capture means, the output means includes a display device that displays an image, the output data includes an image displayed by the display device, the instruction information includes display image-frame information indicating a region corresponding to a portion, which is to be displayed on the display device, of the image that is the material data, and the generating means generates the output data by extracting an image corresponding to the region indicated by the display image-frame information from the image that includes the material data.

11. The broadcasting system according to claim 8, wherein the sensor includes image-capture means for capturing an image, the material data includes an image captured by the image-capture means, the output means includes a display device that displays an image, the output data includes an image displayed by the display device, and the effect information includes to-be-combined data that is to be combined with the image which includes the material data, and the generating means generates the output data by combining, based on the effect information, the to-be-combined data with the image that includes the material data.

12. The broadcasting system according to claim 11, wherein the to-be-combined data includes data concerning a subtitle or data for picture in picture.

13. The broadcasting system according to claim 8, wherein the sensor includes image-capture means for capturing an image, the material data includes an image captured by the image-capture means, the output means includes a display device that displays an image, the output data includes an image displayed by the display device, the effect information includes display image-frame information indicating a region corresponding to a portion, which is to be displayed on the display device, of the image that includes the material data, and the generating means generates the output data by extracting an image corresponding to the region indicated by the display image-frame information from the image that includes the material data.

14. The broadcasting system according to claim 8, wherein the sensor includes image-capture means for capturing an image, the plurality of streams of moving images are captured by the image-capture means, and the output means includes the display device.

15. The broadcasting system according to claim 9, wherein the additional information further includes real-world information indicating a physical amount in the real world, and when no processing instruction is provided by the user, the generating means generates the output based on the material data, the real-world information, and characteristics information indicating characteristics of the output means so that a physical amount recognized from the output produced by the output means is identified as being the physical amount indicated by the real-world information.

16. The broadcasting system according to claim 11, wherein the receiving apparatus further includes instruction input means for accepting a processing instruction that is provided by a user, and the generating means subjects, based on the effect information or instruction information concerning the processing instruction that is provided by the user, the material data to processing that is desired by the user.

17. The broadcasting system according to claim 16, wherein the effect information includes timing information indicating a timing at which combining of the to-be-combined data is performed, and when no processing instruction is provided by the user, the generating means generates the output data by combining, based on the timing information, the to-be-combined data with the image that includes the material data.

18. A sending apparatus that, together with a receiving apparatus which receives data, configures a broadcasting system and that sends the data, the sending apparatus comprising:
   editing means for generating, based on material data acquired by a sensor, at least one of (i) real-world information indicating a physical amount, in the real world, of a target sensed by the sensor as additional information to be used to carry out a reality-mode process on the material data at the receiving apparatus or (ii) effect information as additional information to be used to carry out an entertainment-mode process on the material data at the receiving apparatus; and
   sending means for sending the material data and the additional information,
   wherein the material data includes pieces of material data, the pieces of material data are derived from a plurality of streams of moving images, and the effect information includes switching information for switching among images to be displayed on a display device by selecting a time code, for each one of the pieces of material data, one or more images from an associated one of the plurality of streams of moving images.

19. A sending method for a sending apparatus that, together with a receiving apparatus which receives data, configures a broadcasting system and that sends the data, the sending method comprising:
   a step of generating, based on material data acquired by a sensor, at least one of (i) real-world information indicating a physical amount, in the real world, of a target sensed by the sensor as additional information to be used to carry out a reality-mode process on the material data at the receiving apparatus or (ii) effect information as additional information to be used to carry out an entertainment-mode process on the material data at the receiving apparatus; and
   a step of sending the material data and the additional information,
   wherein the material data includes pieces of material data, the pieces of material data are derived from a plurality of streams of moving images, and the effect information includes switching information for switching among images to be displayed on a display device by selecting a time code, for each one of the pieces of material data, one or more images from an associated one of the plurality of streams of moving images.

20. A non-transitory recording medium having recorded thereon a computer program for causing a computer to function as a sending apparatus that, together with a receiving apparatus which receives data, configures a broadcasting system and that sends the data, the program causing the computer to function as:
   editing means for generating, based on material data acquired by a sensor, at least one of (i) real-world information indicating a physical amount, in the real world, of a target sensed by the sensor as additional information to be used to carry out a reality-mode process on the material data at the receiving apparatus or (ii) effect information as additional information to be used to carry out an entertainment-mode process on the material data at the receiving apparatus; and
   sending means for sending the material data and the additional information,
   wherein the material data includes pieces of material data, the pieces of material data are derived from a plurality of streams of moving images, and the effect information includes switching information for switching among images to be displayed on a display device by selecting a time code, for each one of the pieces of material data, one or more images from an associated one of the plurality of streams of moving images.

21. A receiving apparatus that, together with a sending apparatus which sends data, configures a broadcasting system and receives the data, the
   receiving apparatus comprising:
   receiving means for receiving material data and additional information in a case in which the sending apparatus generates, based on the material data acquired by a sensor, at least one of (i) real-world information indicating a physical amount, in the real world, of a target sensed by the sensor as the additional information to be used to carry out a reality-mode process on the material data at the receiving apparatus or (ii) effect information as the additional information to be used to carry out an entertainment-mode process on the material data at the receiving apparatus, and sends the material data and the additional information, generating means for generating output data based on the material data and the additional information, and
   producing means for producing output based on the output data with output means for producing output,
   wherein the material data includes pieces of material data, the pieces of material data are derived from a plurality of streams of moving images, the effect information includes switching information for switching among images to be displayed on a display device by selecting a time code, for each one of the pieces of material data, one or more images from an associated one of the plurality of streams of moving images, and
   the generating means generates the output data based on the switching information, the output data including the images to be displayed by the display device.

22. A receiving method for a receiving apparatus that, together with a sending apparatus which sends data, configures a broadcasting system and receives the data, the receiving method comprising:
   in a case in which the sending apparatus generates, based on material data acquired by a sensor, at least one of (i) real-world information indicating a physical amount, in the real world, of a target sensed by the sensor as additional information to be used to carry out a reality-mode process on the material data at the receiving apparatus or (ii) effect information as additional information to be used to carry out an entertainment-mode process on the material data at the receiving apparatus, and sends the material data and the additional information, receiving the material data and the additional information, generating output data based on the material data and the additional information, and producing output based on the output data with output means for producing output, wherein the material data includes pieces of material data, the pieces of material data are derived from a plurality of streams of moving images, the effect information includes switching information for switching among images to be displayed on a display device by selecting a time code, for each one of the pieces of material data, one or more images from an associated one of the plurality of streams of moving images, and the generating step generates the output data based on the switching information, the output data including the images to be displayed by the display device.

23. A non-transitory recording medium having recorded thereon a computer program for causing a computer to function as a receiving apparatus that, together with a sending apparatus which sends data, configures a broadcasting system and receives the data, the program causing the computer to function as:

receiving means for receiving material data and additional information in a case in which the sending apparatus generates, based on the material data acquired by a sensor, at least one of (i) real-world information indicating a physical amount, in the real world, of a target sensed by the sensor as the additional information to be used to carry out a reality-mode process on the material data at the receiving apparatus or (ii) effect information as the additional information to be used to carry out an entertainment-mode process on the material data at the receiving apparatus, and sends the material data and the additional information, generating means for generating output data based on the material data and the additional information, and output means for producing output based on the output data, wherein the material data includes pieces of material data, the pieces of material data are derived from a plurality of streams of moving images, the effect information includes switching information for switching among images to be displayed on a display device by selecting a time code, for each one of the pieces of material data, one or more images from an associated one of the plurality of streams of moving images, and the generating means generates the output data based on the switching information, the output data including the images to be displayed by the display device.

* * * * *